United States Patent
Yamauchi et al.

(10) Patent No.: US 10,348,935 B2
(45) Date of Patent: Jul. 9, 2019

(54) COLOR CONVERSION DEVICE, IMAGE FORMING APPARATUS, AND NON-TRANSITORY COMPUTER READABLE MEDIUM

(71) Applicant: FUJI XEROX Co., LTD., Tokyo (JP)

(72) Inventors: Kaoru Yamauchi, Kanagawa (JP);
Masahiko Kubo, Kanagawa (JP);
Yosuke Tashiro, Kanagawa (JP); Ayako Watanabe, Kanagawa (JP); Kaori Iwaki, Kanagawa (JP)

(73) Assignee: FUJI XEROX CO., LTD., Minto-Ku, Tokyo (JP)

(*) Notice: Subject to any disclaimer, the term of this patent is extended or adjusted under 35 U.S.C. 154(b) by 0 days.

(21) Appl. No.: 15/916,730

(22) Filed: Mar. 9, 2018

(65) Prior Publication Data
US 2018/0367705 A1 Dec. 20, 2018

(30) Foreign Application Priority Data

Jun. 15, 2017 (JP) .................... 2017-117524

(51) Int. Cl.
*H04N 1/04* (2006.01)
*H04N 1/60* (2006.01)
(Continued)

(52) U.S. Cl.
CPC ......... *H04N 1/6019* (2013.01); *G06T 11/001* (2013.01); *H04N 1/54* (2013.01);
(Continued)

(58) Field of Classification Search
CPC ...... H04N 1/6019; H04N 1/6008; H04N 1/54; H04N 1/6033; H04N 1/6086; H04N 1/622
(Continued)

(56) References Cited

U.S. PATENT DOCUMENTS

| 8,711,432 | B2 | 4/2014 | Ito | |
|---|---|---|---|---|
| 9,254,677 | B2* | 2/2016 | Kobashi | B41J 2/1433 |
| 2017/0359485 | A1* | 12/2017 | Shimada | B41J 2/451 |

FOREIGN PATENT DOCUMENTS

| JP | 5909887 B2 | 4/2016 |
|---|---|---|
| JP | 5920580 B2 | 5/2016 |

* cited by examiner

Primary Examiner — Houshang Safaipour
(74) Attorney, Agent, or Firm — Sughrue Mion, PLLC

(57) ABSTRACT

A color conversion device includes a receiving unit receiving colorimetric values obtained by measuring plural target-color images of different tones from plural directions; a memory storing a color conversion model associating a combination of colorimetric direction and color material amounts of respective colors and actually measured color values; and a converter converting the colorimetric values into color values including values indicative of amounts of glittering color material and other color materials, wherein the converter calculates, for each target-color image, a weighted average of color differences between colorimetric values of the target-color image in colorimetric directions and color values in the colorimetric directions obtained from the model by using preset weighting coefficients and selects a combination of weighting coefficients that makes tone characteristics closest to tone characteristics of the target-color images by changing the weighting coefficients when a combination of color material amounts minimizing the weighted average is determined.

15 Claims, 36 Drawing Sheets

(51) Int. Cl.
*G06T 11/00* (2006.01)
*H04N 1/54* (2006.01)
*H04N 1/62* (2006.01)

(52) U.S. Cl.
CPC ......... *H04N 1/6008* (2013.01); *H04N 1/6033* (2013.01); *H04N 1/6086* (2013.01); *H04N 1/622* (2013.01)

(58) Field of Classification Search
USPC ........................................................ 358/1.9
See application file for complete search history.

FIG. 9

WEIGHTED AVERAGE ΔE(WAVG) OF COLOR DIFFERENCES
= {w1×(COLOR DIFFERENCE BETWEEN L*a*b*(15°) AND f(C, M, Y, K=0, Si, 15°))
+w2×(COLOR DIFFERENCE BETWEEN L*a*b*(45°) AND f(C, M, Y, K=0, Si, 45°))
+w3×(COLOR DIFFERENCE BETWEEN L*a*b*(110°) AND f(C, M, Y, K=0, Si, 110°))}/(w1+w2+w3)

w1: WEIGHTING COEFFICIENT IN SPECULAR DIRECTION (15°)
w2: WEIGHTING COEFFICIENT IN FRONT DIRECTION (45°)
w3: WEIGHTING COEFFICIENT IN DIFFUSION LIGHT DIRECTION (110°)

CALCULATE CMY VALUES THAT MINIMIZE
WEIGHTED AVERAGE ΔE(WAVG) OF COLOR DIFFERENCES.

FIG. 19

|  | W1 (COLORIMETRIC DIRECTION: 15°) | W2 (COLORIMETRIC DIRECTION: 45°) | W3 (COLORIMETRIC DIRECTION: 110°) |
|---|---|---|---|
| MULTI-ANGLE AVERAGE | 1.0 | 1.0 | 1.0 |
| PARAMETER 1 | 0.85 | 1.0 | 0.85 |
| PARAMETER 2 | 0.65 | 1.0 | 0.65 |
| PARAMETER 3 | 0.4 | 1.0 | 0.4 |
| PARAMETER 4 | 0.2 | 1.0 | 0.2 |
| PARAMETER 5 (MEASURED AT 45°) | 0 | 1.0 | 0 |

FIG. 20

| COLOR NUMBER | TONE NUMBER | MULTI-ANGLE AVERAGE | PARAMETER 1 | PARAMETER 2 | PARAMETER 3 | PARAMETER 4 | PARAMETER 5 (MEASURED AT 45°) |
|---|---|---|---|---|---|---|---|
| 8420C | TONE 1 | 18.179 | 18.180 | 18.189 | 25.605 | 25.605 | 25.605 |
| 8421C | TONE 2 | 18.845 | 18.799 | 18.902 | 24.898 | 24.899 | 24.899 |
| 8422C | TONE 3 | 19.851 | 19.841 | 22.686 | 22.686 | 22.686 | 22.687 |
| 8423C | TONE 4 | 18.838 | 19.432 | 19.433 | 19.433 | 19.433 | 19.432 |
| 8424C | TONE 5 | 13.089 | 13.088 | 13.088 | 13.089 | 13.089 | 13.090 |
| 8425C | TONE 6 | 13.798 | 13.798 | 13.797 | 13.797 | 13.797 | 13.798 |

FIG. 23

| COLOR NUMBER | TONE NUMBER | MULTI-ANGLE AVERAGE | PARAMETER 1 | PARAMETER 2 | PARAMETER 3 | PARAMETER 4 | PARAMETER 5 (MEASURED AT 45°) |
|---|---|---|---|---|---|---|---|
| 8420C | TONE 1 | 0.000 | 0.001 | 0.010 | 7.426 | 7.426 | 7.426 |
| 8421C | TONE 2 | 0.000 | −0.046 | 0.057 | 6.053 | 6.054 | 6.054 |
| 8422C | TONE 3 | 0.000 | −0.010 | 2.835 | 2.835 | 2.835 | 2.836 |
| 8423C | TONE 4 | 0.000 | 0.594 | 0.595 | 0.595 | 0.595 | 0.594 |
| 8424C | TONE 5 | 0.000 | −0.001 | −0.001 | 0.000 | 0.000 | 0.001 |
| 8425C | TONE 6 | 0.000 | 0.000 | −0.001 | −0.001 | −0.001 | 0.000 |

FIG. 24

| COLOR NUMBER | TONE NUMBER | MULTI-ANGLE AVERAGE | PARAMETER 1 | PARAMETER 2 | PARAMETER 3 | PARAMETER 4 | PARAMETER 5 (MEASURED AT 45°) |
|---|---|---|---|---|---|---|---|
| 8420C | TONE 1 | 0.000 | 0.001 | 0.010 | 7.426 | 7.426 | 7.426 |
| 8421C | TONE 2 | 0.000 | -0.046 | 0.057 | 6.053 | 6.054 | 6.054 |
| 8422C | TONE 3 | 0.000 | -0.010 | 2.835 | 2.835 | 2.835 | 2.836 |
| 8423C | TONE 4 | 0.000 | 0.594 | 0.595 | 0.595 | 0.595 | 0.594 |
| 8424C | TONE 5 | 0.000 | -0.001 | -0.001 | 0.000 | 0.000 | 0.001 |
| 8425C | TONE 6 | 0.000 | 0.000 | -0.001 | -0.001 | -0.001 | 0.000 |

FIG. 25

| COLOR NUMBER | TONE NUMBER | MULTI-ANGLE AVERAGE | PARAMETER 1 | PARAMETER 2 | PARAMETER 3 | PARAMETER 4 | PARAMETER 5 (MEASURED AT 45°) |
|---|---|---|---|---|---|---|---|
| 8420C | TONE 1 | 0.000 | 0.001 | 0.010 | 7.426 | 7.426 | 7.426 |
| 8421C | TONE 2 | 0.000 | −0.046 | 0.057 | 6.053 | 6.054 | 6.054 |
| 8422C | TONE 3 | 0.000 | −0.010 | 2.835 | 2.835 | 2.835 | 2.836 |
| 8423C | TONE 4 | 0.000 | 0.594 | 0.595 | 0.595 | 0.595 | 0.594 |
| 8424C | TONE 5 | 0.000 | −0.001 | −0.001 | 0.000 | 0.000 | 0.001 |
| 8425C | TONE 6 | 0.000 | 0.000 | −0.001 | −0.001 | −0.001 | 0.000 |

⇐ SELECT PARAMETER 1

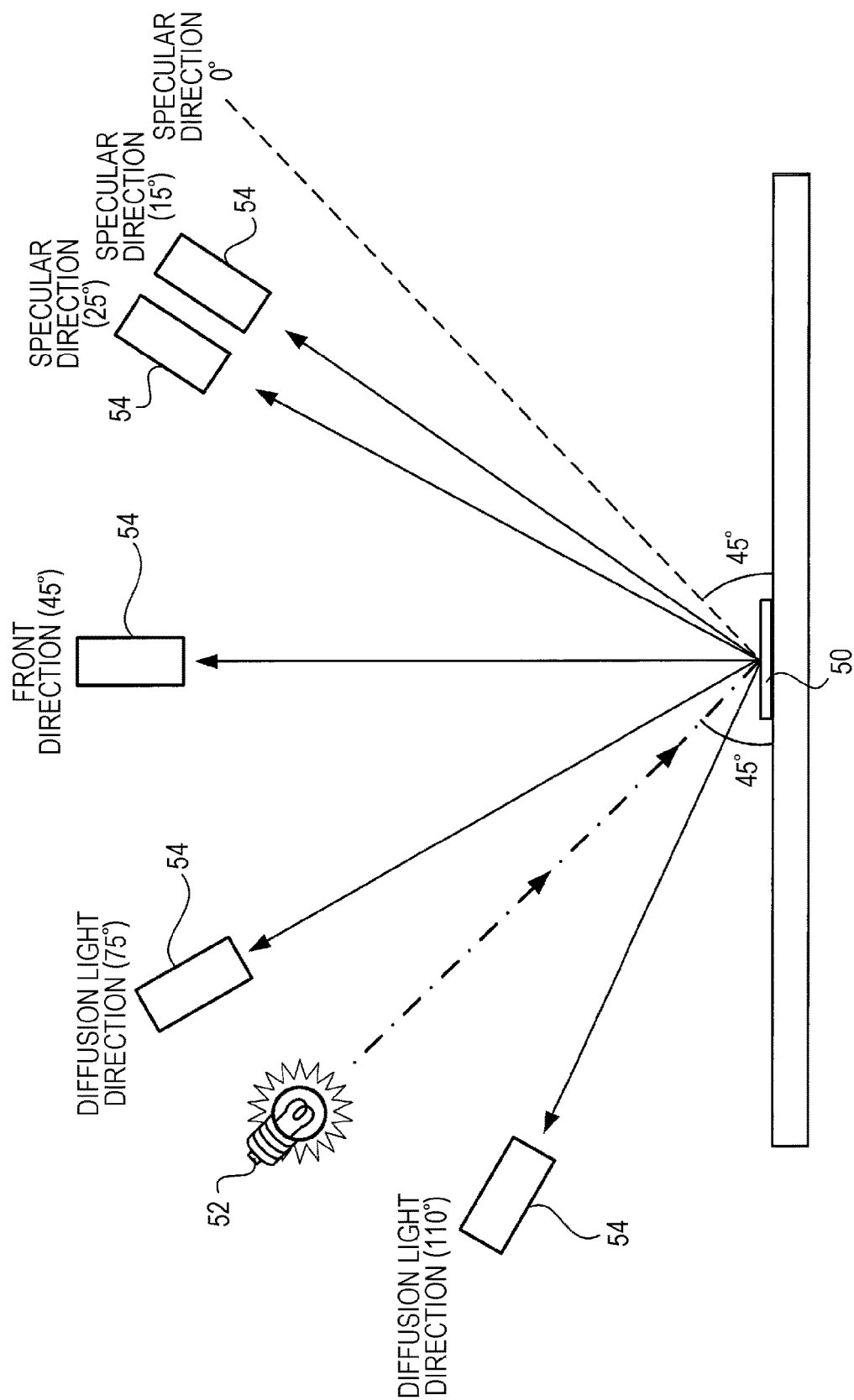

COLOR CONVERSION DEVICE, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-117524 filed Jun. 15, 2017.

BACKGROUND

Technical Field

The present invention relates to a color conversion device, an image forming apparatus, and a non-transitory computer readable medium.

SUMMARY

According to an aspect of the invention, there is provided a color conversion device including a receiving unit that receives plural colorimetric values obtained by measuring plural target-color images of different tones from plural directions; a memory in which a color conversion model in which a combination of a colorimetric direction and amounts of color materials of respective colors and actually measured color values are associated is stored; and a converter that converts the plural colorimetric values received by the receiving unit into color values including a value indicative of an amount of a glittering color material and a value indicative of an amount of a color material other than the glittering color material, wherein the converter calculates, for each of the target-color images of the respective tones, a weighted average of color differences between colorimetric values of the target-color image in colorimetric directions and color values in the colorimetric directions obtained from the color conversion model by using preset weighting coefficients and selects a combination of weighting coefficients that makes tone characteristics closest to tone characteristics of the target-color images of the respective tones by changing the weighting coefficients for calculation of a weighted average of the color differences in the colorimetric directions when a combination of color material amounts that minimize the weighted average of the color differences is determined.

BRIEF DESCRIPTION OF THE DRAWINGS

An exemplary embodiment of the present invention will be described in detail based on the following figures, wherein:

FIG. 9 is a view for explaining a method for calculating a weighted average of color differences calculated in color conversion in the converter;

FIG. 19 is a table for explaining parameters having different values of weighting coefficients;

FIG. 20 illustrates an example of weighted averages of color differences calculated by using the parameters of weighting coefficients;

FIG. 23 illustrates an example of differences between a multi-angle average color difference and weighted average color differences (weighted averages of color differences) calculated by using the other parameters;

FIG. 24 is a view for explaining how a parameter in which a difference between a multi-angle average color difference and a weighted-average color difference is equal to or smaller than 1 and weighting coefficients are smallest is selected for each tone;

FIG. 25 is a view for explaining how a parameter in which the weighting coefficients are largest among plural parameters selected in any of the tones is selected;

FIG. 36 is a view for explaining a case where a color is measured from colorimetric directions of five angles.

DETAILED DESCRIPTION

Next, an exemplary embodiment of the present invention is described in detail below with reference to the drawings.

Figure 1:
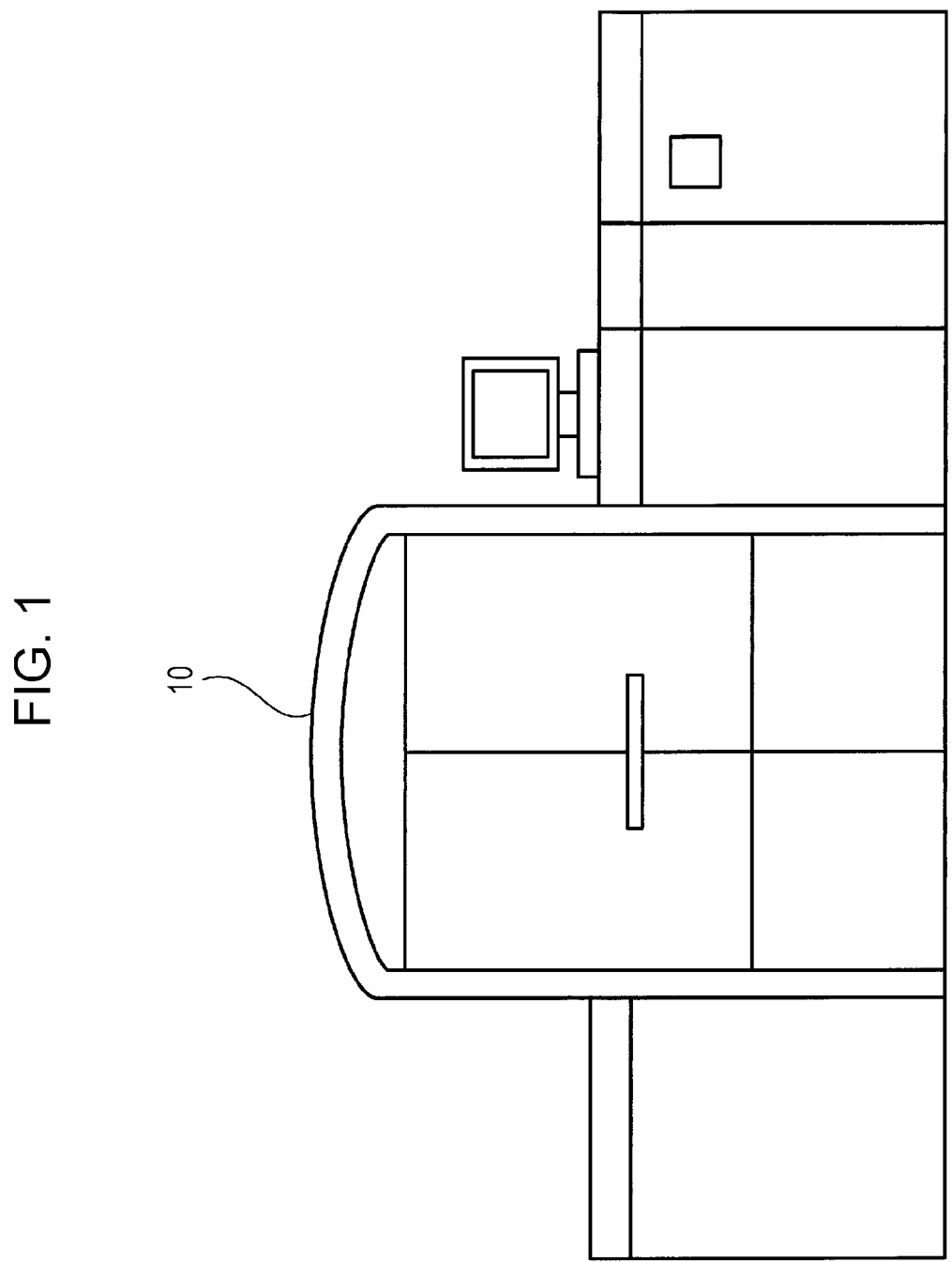
FIG. 1 illustrates an external configuration of an image forming apparatus according to an exemplary embodiment of the present invention.

FIG. 1 illustrates an external configuration of an image forming apparatus 10 according to an exemplary embodiment of the present invention.

As illustrated in FIG. 1, the image forming apparatus 10 according to the present exemplary embodiment is a production printer for business use and has a function for printing of high image quality and high speed.

Figure 2:
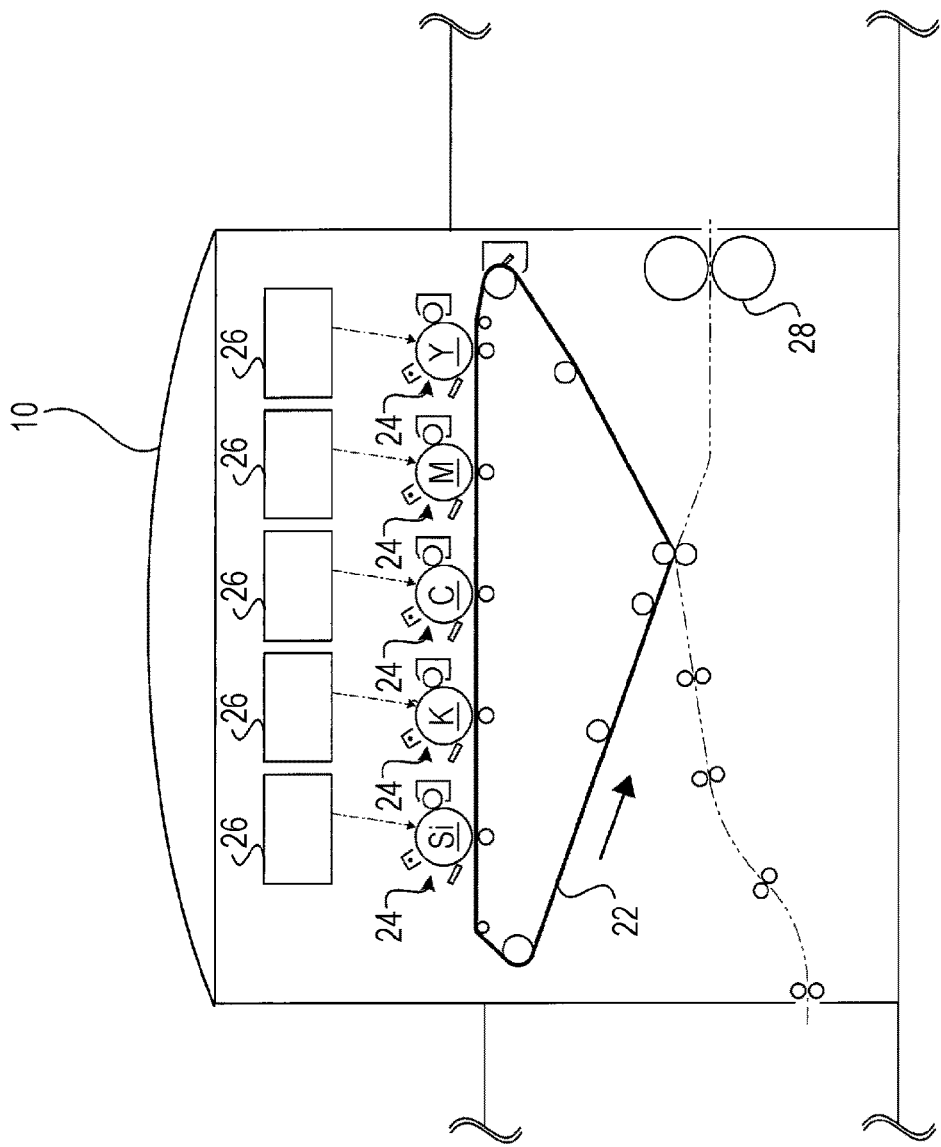
FIG. 2 is a view for explaining an internal structure of the image forming apparatus.

An internal structure of the image forming apparatus 10 is described below with reference to FIG. 2. As illustrated in FIG. 2, the image forming apparatus 10 includes five image forming units 24. The five image forming units 24 are configured to form images by using yellow (Y), magenta (M), cyan (C), black (K), and spot-color toner.

Examples of the spot-color toner include silver toner (Si), gold toner (G), transparent toner, and white toner, and any one of these kinds of spot-color toner can be selected and used. FIG. 2 illustrates a case where silver toner (Si) among these kinds of spot-color toner is selected and used.

Although a case where an image is formed by using metallic (metallic luster color) toner such as silver toner or gold toner and where toner amounts of the respective colors CMYKSi are determined is described in the present exemplary embodiment, the following describes a case where an image is formed by using silver toner.

Each of the image forming units 24 includes a photoconductor drum, a charging device that uniformly charges a surface of the photoconductor drum, a developing device that develops an electrostatic latent image formed on the photoconductor drum, and the like. On the photoconductor drum of each of the image forming units 24, an electrostatic latent image is formed by laser light emitted from an optical scanning device 26 and is developed by toner of a corresponding color, and thus an image is formed.

Then, images of the respective colors formed in the image forming units 24 are transferred onto an intermediate transfer belt 22 and are then further transferred onto a printing sheet that has been transported. Then, the toner images transferred onto the printing sheet are fixed on the printing sheet by heat and pressure by a fixing unit 28.

Figure 3:
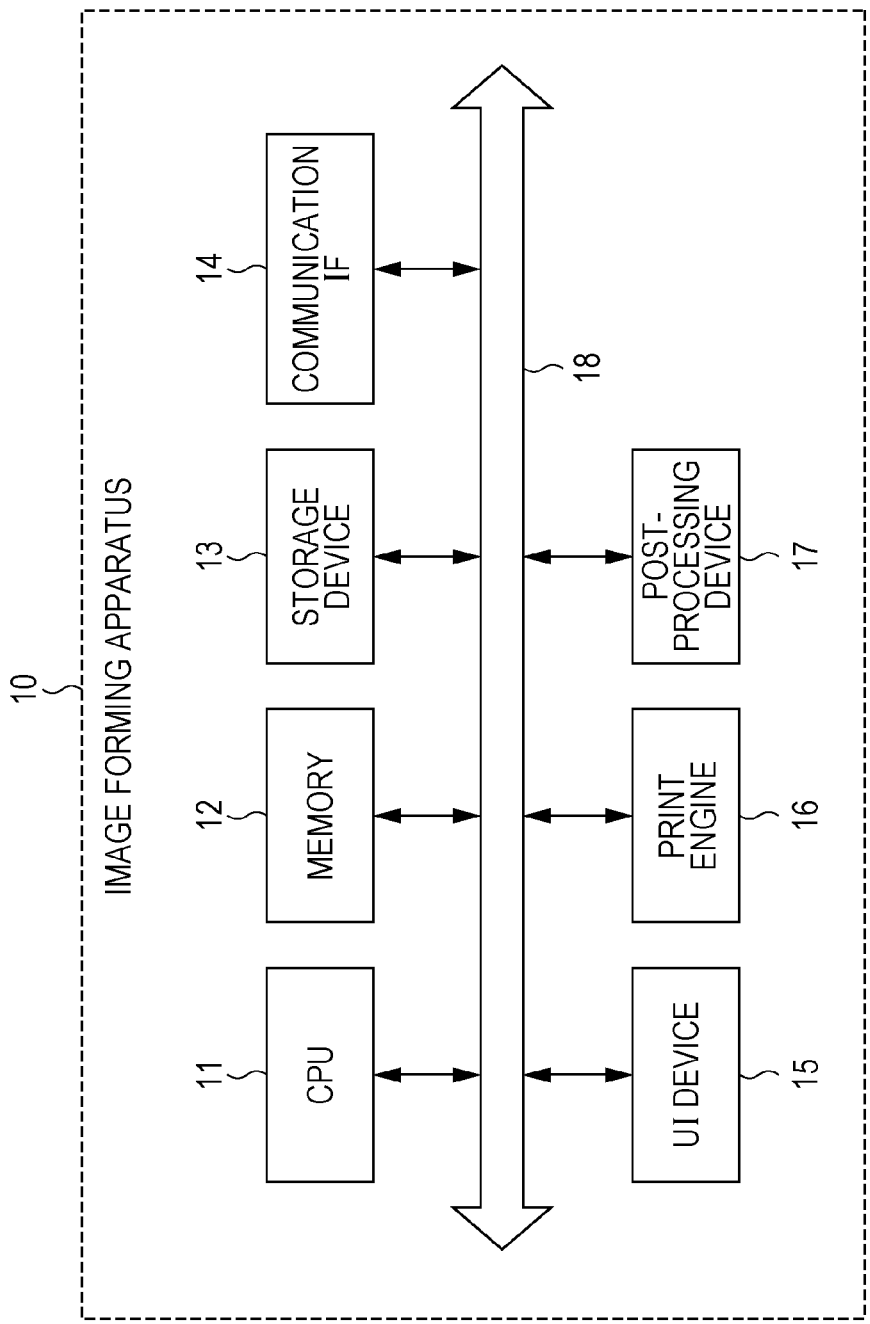
FIG. 3 is a block diagram illustrating a hardware configuration of the image forming apparatus according to the exemplary embodiment of the present invention.

Next, a hardware configuration of the image forming apparatus 10 according to the present exemplary embodiment is illustrated in FIG. 3.

As illustrated in FIG. 3, the image forming apparatus 10 includes a central processing unit (CPU) 11, a memory 12, a storage device 13 such as a hard disk drive (HDD), a communication interface (IF) 14 that transmits and receives data to and from an external device or the like over a network 30, a user interface (UI) device 15 including a touch panel or a liquid crystal display and a keyboard, a print engine 16, and a post-processing device 17. These constituent elements are connected to one another through a control bus 18.

The print engine 16 prints an image on a recording medium such as a printing sheet through steps such as charging, exposure, development, transfer, and fixation. The post-processing device 17 performs various kinds of post-processing such as staple processing, punching processing, and folding processing on a sheet of paper that has been subjected to the printing processing by the print engine 16.

The CPU 11 controls an operation of the image forming apparatus 10 by performing predetermined processing based on a control program stored in the memory 12 or the storage device 13. In the present exemplary embodiment, the CPU 11 reads out and executes a control program stored in the memory 12 or the storage device 13. However, the program stored in a recording medium such as a CD-ROM may be offered to the CPU 11.

Figure 4:
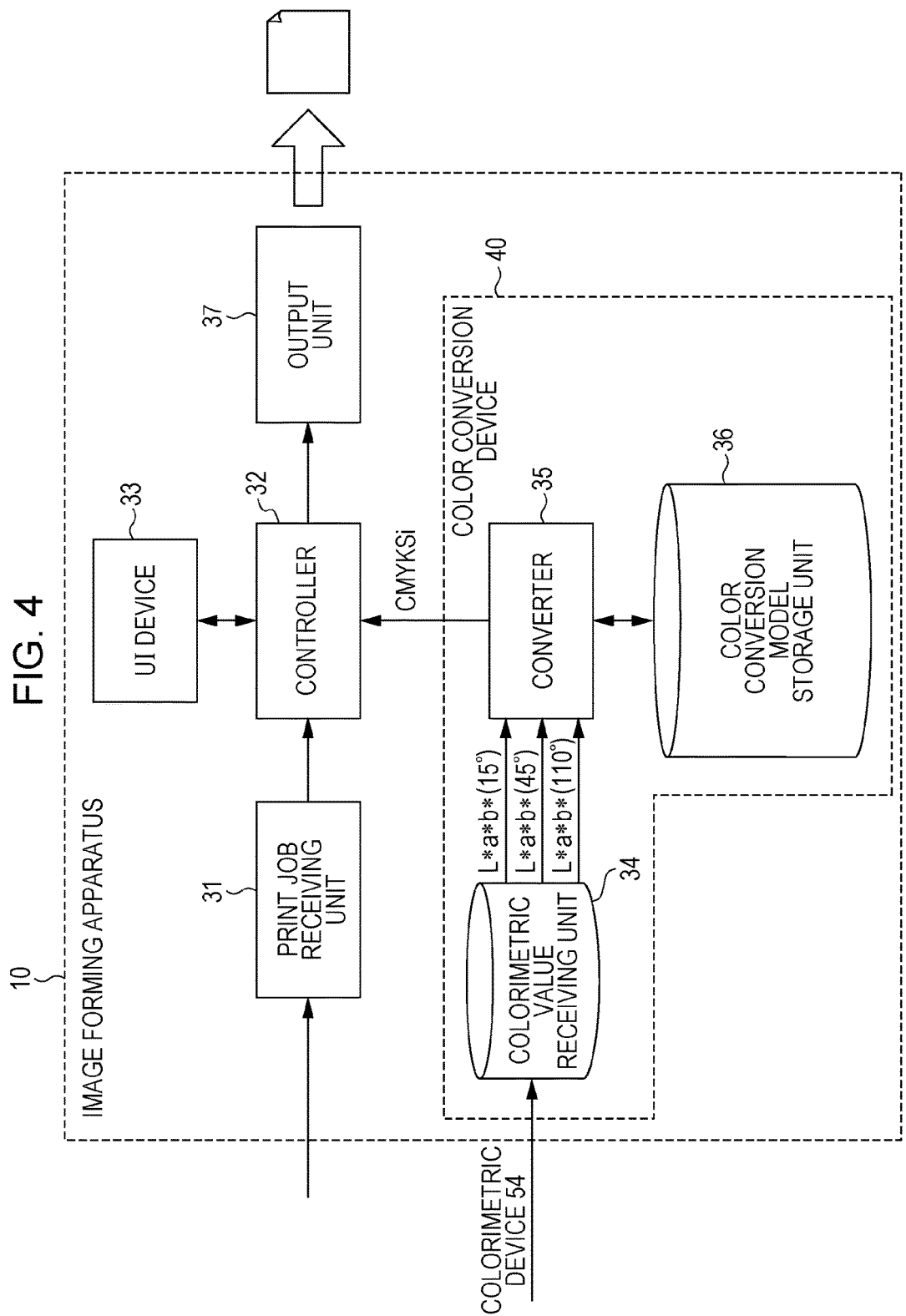
FIG. 4 is a block diagram illustrating a functional configuration of the image forming apparatus according to the exemplary embodiment of the present invention.

FIG. 4 is a block diagram illustrating a functional configuration of the image forming apparatus 10 achieved by execution of the control program.

As illustrated in FIG. 4, the image forming apparatus 10 according to the present exemplary embodiment includes a print job receiving unit 31, a controller 32, a UI device 33, a colorimetric value receiving unit 34, a converter 35, a color conversion model (printer model) storage unit 36, and an output unit 37. The colorimetric value receiving unit 34, the converter 35, and the color conversion model storage unit 36 constitute a color conversion device 40.

The print job receiving unit 31 receives a print instruction from an external terminal apparatus or the like over a network.

The controller 32 performs print processing by controlling the output unit 37 on the basis of a print job received by the print job receiving unit 31.

The UI device 33 is a device that receives a user's operation and displays various kinds of information for a user.

In a case where a spot color is designated in an image indicated by the print job received by the print job receiving unit 31, the controller 32 determine an amount of toner of the designated spot color on the basis of an instruction from the color conversion device 40.

In order to determine an amount of toner of a spot color in advance, the color conversion device 40 receives colorimetric values of a color sample image of a spot color from a colorimetric device 54 (not illustrated), converts the colorimetric values into CMYKSi values including silver toner (Si toner), and supplies the CMYKSi values to the controller 32. The following describes the colorimetric value receiving unit 34, the converter 35, and the color conversion model storage unit 36 that constitute the color conversion device 40.

The colorimetric value receiving unit 34 receives plural colorimetric values obtained by measurement of a target-color image that is a color sample of a spot color from plural directions. Specifically, as illustrated in FIG. 5, in a case where the target-color image is obliquely irradiated with light, the colorimetric value receiving unit 34 receives a colorimetric value of the target color measured in a front direction (45°) that is a direction normal to the target-color image, a colorimetric value of the target-color image measured in a specular direction (15°) that is a direction of specular reflection of the light, and a colorimetric value of the target-color image measured in a diffusion light direction (110°) closer to a light incident direction than to the front direction (45°).

Figure 5:
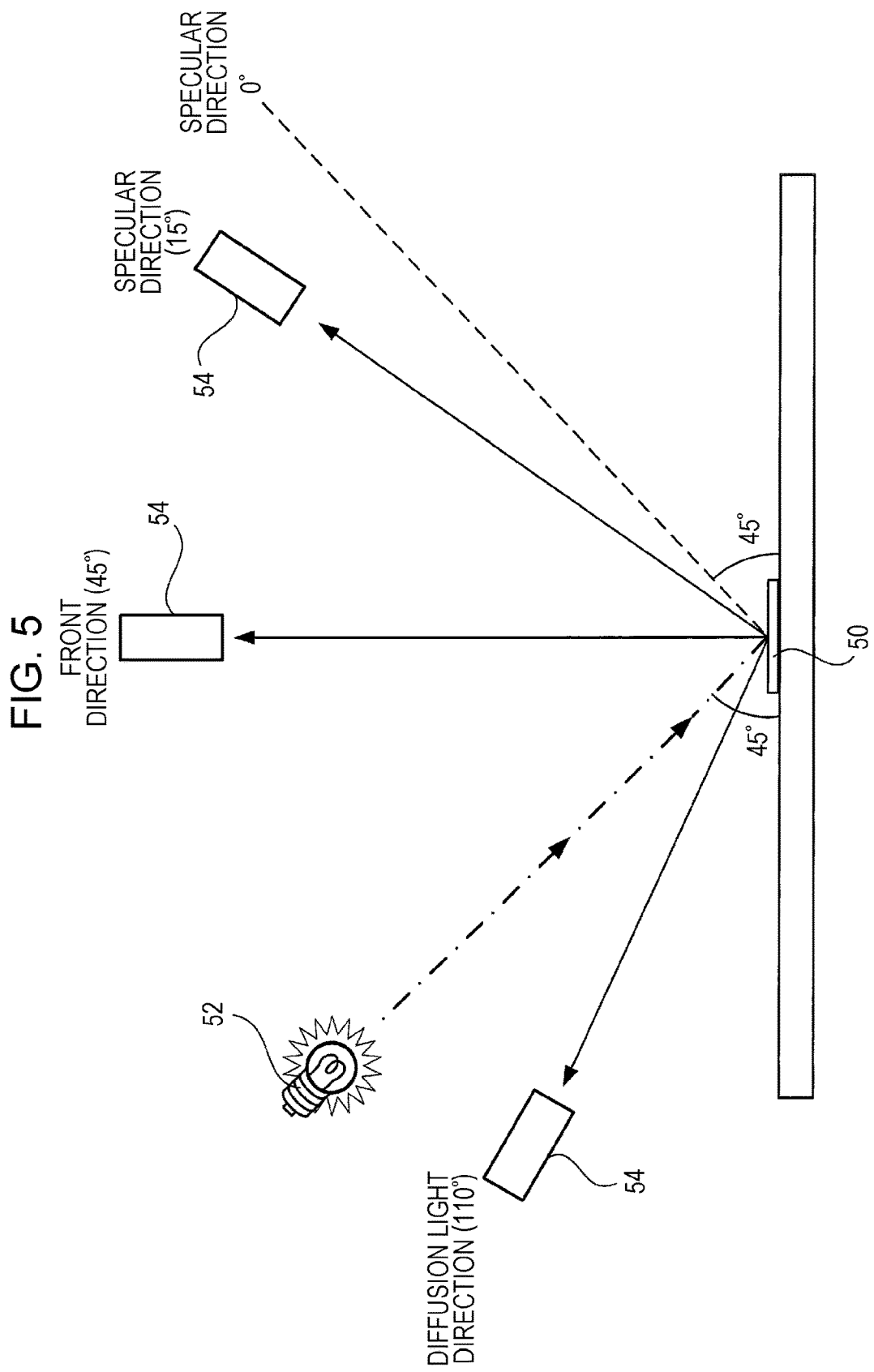
FIG. 5 illustrates a case where a color of an image to be measured is measured from colorimetric directions of three angles (15°, 45°, and 110°)

FIG. 5 illustrates a case where a color of an image to be measured 50 is measured from colorimetric directions of three angles (15°, 45°, and 110°). Specifically, FIG. 5 illustrates a case where the color of the image to be measured 50 is measured from directions of 15°, 45°, and 110° by the colorimetric devices 54 in a case where the image to be measured 50 is irradiated with light emitted from a light source 52 from an oblique direction of 45° and where a specular direction is 0 degree (reference direction).

In FIG. 5, the direction of 45° is a front direction of (a direction normal to) the image to be measured 50. The direction of 15° is a specular direction for measurement of specular light of the image to be measured 50. A reason why the specular direction for measurement of specular light is not a direction of 0 degree but a direction of 15° is that in a case where the image to be measured 50 is measured in the direction of 0 degree, specular light directly enters the colorimetric device 54, and therefore a color shade of the target to be measured cannot be measured.

In FIG. 5, the direction of 110° is set as a diffusion light direction for measurement of diffusion light from the image to be measured 50.

In a case where a color of a general image other than an image (e.g., a color sample of a metallic color) having a color shade that changes depending on a viewing direction is measured, the color is measured only from the front direction (45°). A colorimetric method according to the present exemplary embodiment is different from the general colorimetric method in that colorimetric values are obtained by colorimetric measurement not only in the front direction (45°), but also in the specular direction (15°) and the diffusion light direction (110°).

It is also possible to calculate color values including an amount of silver toner by using colorimetric values in at least two directions, for example, the front direction (45°) and the specular direction (15°).

The converter 35 converts plural colorimetric values received by the colorimetric value receiving unit 34 into color values (CMYKSi) including a value Si indicative of an amount of silver toner that is a glittering color material and amounts CMYK indicative of amounts of toner other than the silver toner.

Figure 6:
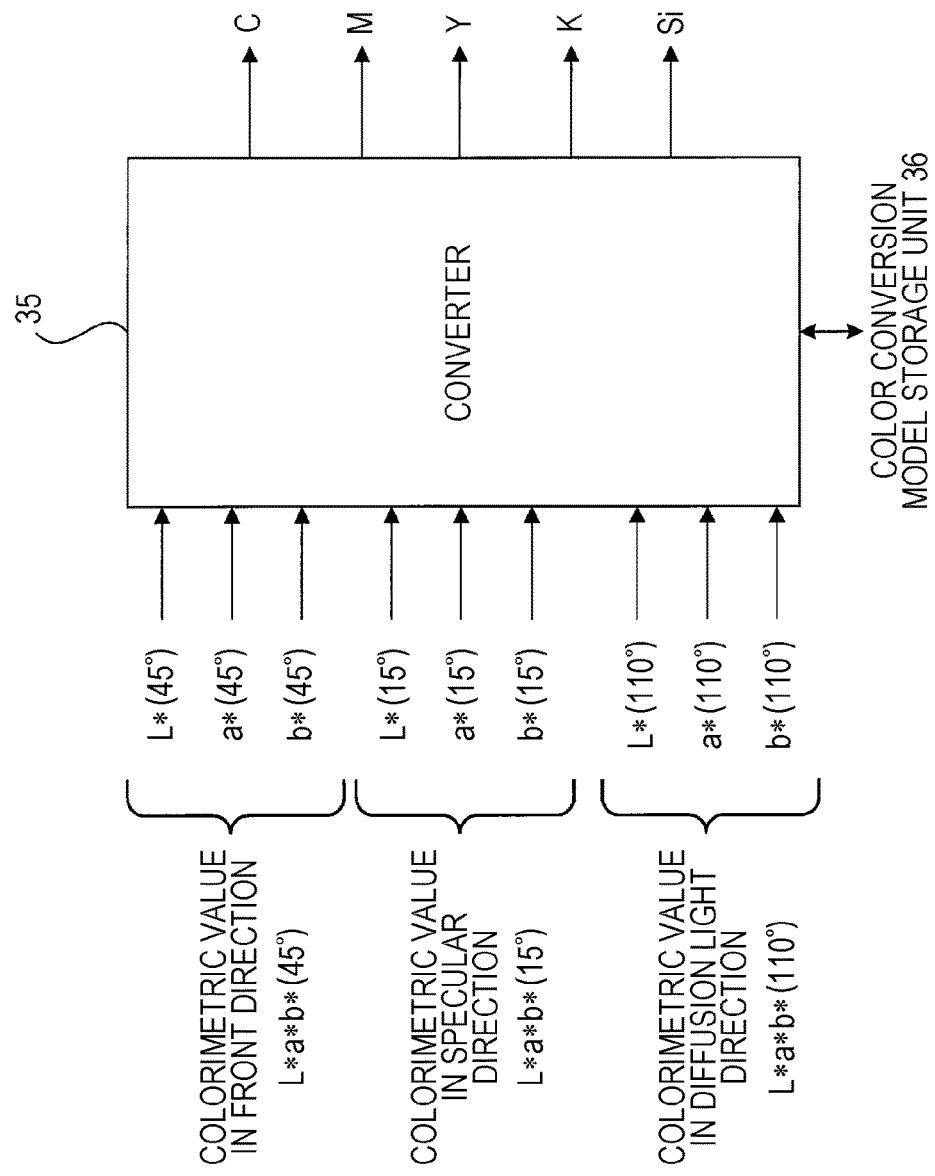
FIG. 6 illustrates how a converter converts colorimetric values in the colorimetric directions of three angles into values (CMYKSi) indicative of amounts of toner of respective colors.

FIG. 6 illustrates how the converter 35 converts colorimetric values in the colorimetric directions of three angles into values (CMYKSi) indicative of toner amounts of toner of the respective colors.

In the present exemplary embodiment, a case where colorimetric values output from the colorimetric device 54 are signals expressed by the L*a*b* color system is described. Accordingly, in the following description, colorimetric values in the front direction (45°) are expressed as L*a*b* (45°), colorimetric values in the specular direction (15°) are expressed as L*a*b* (15°), and colorimetric values in the diffusion light direction (110°) are expressed as L*a*b* (110°).

As illustrated in FIG. 6, the converter 35 receives colorimetric values (L*(45°), a*(45°), and b*(45°)) in the front direction, colorimetric values (L*(15°), a*(15°), and b*(15°)) in the specular direction, and colorimetric values (L*(110°), a*(110°), and b*(110°)) in the diffusion light direction and then output CMYKSi values by using a color conversion model stored in the color conversion model storage unit 36. Details of the process in which the converter 35 converts received colorimetric values into CMYKSi values by using a color conversion model will be described later.

In such a case where a spot color is designated in a print job received by the print job receiving unit 31, the controller 32 controls the output unit 37 to output an image on the basis of color values (CMYKSi) obtained by conversion in the converter 35 of the color conversion device 40.

The color conversion model storage unit 436 stores therein a color conversion model in which a combination of colorimetric directions and toner amounts of toner of the respective colors and actually measured colorimetric values are associated.

Figure 7:
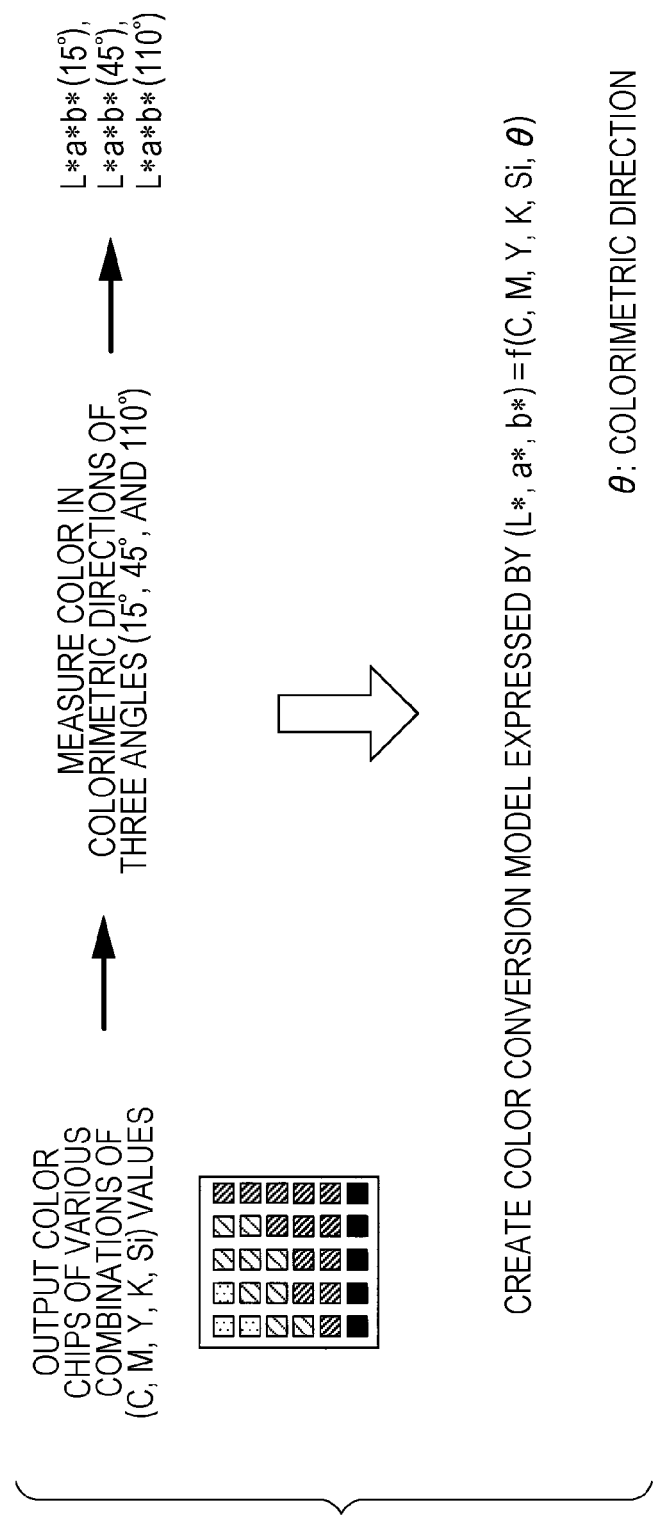
FIG. 7 is a view for explaining a method for creating a color conversion model stored in a color conversion model storage unit.

A method for creating a color conversion model in the color conversion model storage unit 36 is described below with reference to FIG. 7.

First, color chips (patches) of various combinations of C, M, Y, K, and Si values are output. Then, a color of each of the color chips is measured in the colorimetric directions of three angles (15°, 45°, and 110°) by the colorimetric method illustrated in FIG. 5. As a result, colorimetric values L*a*b* (15°), L*a*b* (45°), and L*a*b* (110°) are obtained for each of the color chips.

Then, a color conversion model by which color values (L*, a*, b*) are obtained by input of (C, M, Y, K, Si, θ (colorimetric direction)) is created on the basis of these values.

Specifically, plural combinations of (C, M, Y, K, Si, θ) and (L*, a*, b*) are obtained by measuring colors reproduced by various combinations of C, M, Y, K, Si, and θ values and thus obtaining L*a*b* values in advance. A functional relationship (L*, a*, b*)=f(C, M, Y, K, Si, θ) is obtained by using these combinations, and this functional relationship can be used as a color conversion model. Use of this color conversion model makes it possible to find predicted color values L*a*b* when toner amounts CMYKSi of the respective colors and the colorimetric direction θ are given. A general function as a color conversion model such as interpolation using a multiple regression equation, a neural network, or a direct lookup table can be used as a function used for the color conversion model.

In this way, a color conversion model expressed by the function (L*, a*, b*)=f(C, M, Y, K, Si, θ) is created, and the created color conversion model is stored in the color conversion model storage unit 36.

Figure 8:
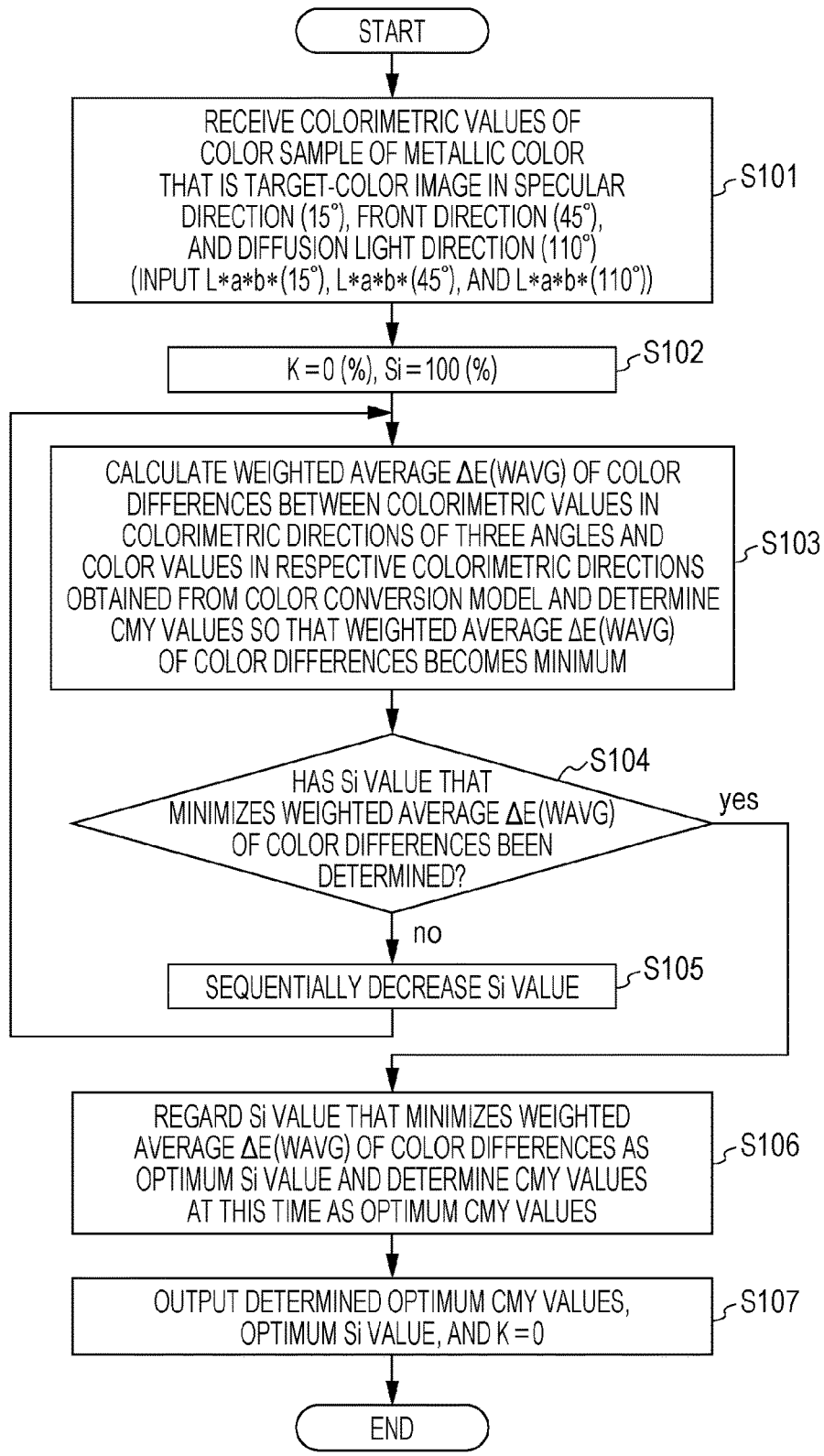
FIG. 8 is a flowchart for explaining an operation of a color conversion device in the image forming apparatus according to the exemplary embodiment of the present invention.

Next, an operation of the color conversion device 40 in the image forming apparatus 10 according to the present exemplary embodiment is described with reference to the flowchart of FIG. 8.

First, the colorimetric value receiving unit 34 receives colorimetric values (L*a*b*(15°), L*a*b*(45°), and L*a*b*(110°)) of a color sample of a metallic color that is a target-color image in the specular direction (15°), the front direction (45°), and the diffusion light direction (110°) (Step S101).

Then, the converter 35 first sets a K value to 0(%) and sets a Si value to 100(%) (Step S102).

Next, the converter 35 determines a combination of color material amounts that minimizes an average of color differences between the colorimetric values of the target-color image in the colorimetric directions of the three angles and color values in the colorimetric directions obtained from the color conversion model (Step S103).

Specifically, the converter 35 calculates a weighted average $\Delta E$ (WAVG) of color differences between the colorimetric values of the target-color image in the colorimetric directions of the three angles and the color values in the colorimetric directions obtained from the color conversion model and determines CMY values that minimize the weighted average $\Delta E$ (WAVG) of the color differences.

A specific example of the weighted average $\Delta E$ (WAVG) of the color differences is described with reference to FIG. 9.

As illustrated in FIG. 9, a weighted average is calculated according to the following formula:

weighted average $\Delta E$(WAVG) of color differences in colorimetric directions={$w1 \times$(color difference between $L^*a^*b^*(15°)$ and $f(C,M,Y,0,Si,15))+w2\times$(color difference between $L^*a^*b^*(45°)$ and $f(C,M,Y,0,Si,45))+w3\times$(color difference between $L^*a^*b^*(110°)$ and $f(C,M,Y,0,Si,110))$}$/(w1+w2+w3)$.

In this formula, w1, w2, and w3 are weighting coefficients in the specular direction (15°), the front direction (45°), and the diffusion light direction (110°), respectively.

For example, in a case where the color differences in the respective colorimetric directions are weighted by using the same value, the weighting coefficients w1, w2, and w3 need just be set to w1=w2=w3=1. In this case, the weighted average $\Delta E$ (WAVG) of the color differences is a simple average.

In a case where a metallic feeling of an output image is adjusted, w1, w2, and w3 need just be changed. For example, in a case where the weighting coefficient w1 is set larger than the weighting coefficients w2 and w3, CMY values are determined so that the color difference in the specular direction (15°) is made smaller, and as a result an image having a more metallic feeling can be obtained.

Note that a color difference $\Delta E$ (PQ) between color values $P=(L_1^*, a_1^*, b_1^*)$ and color values $Q=(L_2^*, a_2^*, b_2^*)$ is calculated by the following calculation formula:

$$\Delta E(PQ)=((L_1^*-L_2^*)^2+(a_1^*-a_2^*)^2+(b_1^*-b_2^*)^2)^{1/2}$$

Then, the converter 35 calculates CMY values that minimize the weighted average $\Delta E$ (WAVG) of the color differences. As a specific method in which the converter 35 calculates CMY values that minimize the weighted average $\Delta E$ (WAVG) of the color differences, for example, a typical method for solving an optimization problem by applying a numerical solution of a non-linear equation such as a simplex method or a Newton method can be used.

In a case where an Si value that minimizes the weighted average $\Delta E$ (WAVG) of the color differences is determined (yes in Step S104), the processing proceeds to Step S106. However, since the Si value has not been determined yet (no in Step S104), the converter 35 sequentially decreases the Si value from 100%, for example, to 99%, 98%, and 97%, . . . (Step S105).

Then, the converter 35 performs the process in Step S103 again and repeats the process until the Si value that minimizes the weighted average $\Delta E$ (WAVG) of the color differences is determined. In a case where the Si value that minimizes the weighted average $\Delta E$ (WAVG) of the color differences is determined (yes in Step S104), this Si value is regarded as an optimum Si value (Step S106).

A method for determining the optimum Si value is described below with reference to FIG. 10.

Figure 10:
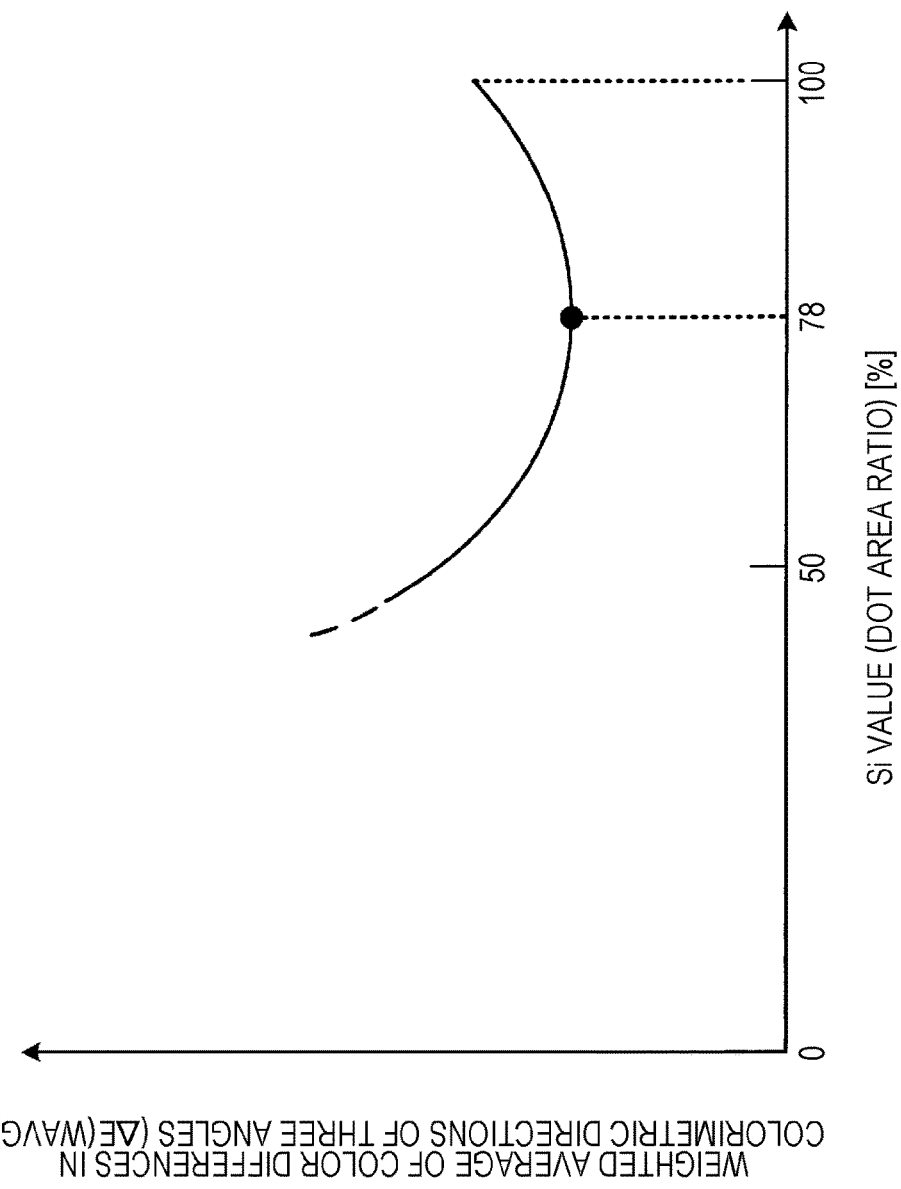
FIG. 10 is a view for explaining a method for determining an optimum Si value.

It is assumed that the weighted average $\Delta E$ (WAVG) of the color differences is changed as illustrated in FIG. 10 by calculating the weighted average $\Delta E$ (WAVG) of the color differences in the colorimetric directions of the three angles while sequentially decreasing the Si value from 100% as described above. In the case illustrated in FIG. 10, the optimum Si value is 78% at which the weighted average $\Delta E$ (WAVG) of the color differences is minimum.

Then, the converter 35 determines that CMY values obtained when the optimum Si is obtained are optimum CMY values (Step S106). That is, the converter 35 determines an optimum Si value that minimizes a minimum value of a weighted average of color differences by sequentially calculating, for each of different toner amounts of Si toner, a minimum value of the weighted average of the color differences obtained in a case where toner amounts of CMY toner other than Si toner are changed without changing a toner amount of Si toner, and then determines a combination of toner amounts that minimizes the weighted average of the color differences by determining toner amounts of CMY toner obtained when the optimum Si value is determined.

Finally, the converter 35 supplies the optimum CMY values, the optimum Si value, and K=0(%) to the controller 32 as toner amounts CMYKSi for the measured color sample image of the metallic color (Step S107).

In this way, the converter 35 determines a toner amount of Si toner that minimizes a minimum value of a weighted average $\Delta E$ (WAVG) of color differences by sequentially calculating, for each of different toner amounts of Si toner, the weighted average $\Delta E$ (WAVG) of the color differences obtained in a case where toner amounts of toner (CMY) other than the Si toner are changed without changing a toner amount of the Si toner, and then determines a combination of toner amounts that minimizes the average of the color differences by determining toner amounts of toner other than the Si toner obtained when the toner amount of Si toner is determined.

Next, a reason why the color conversion device 40 according to the present exemplary embodiment determines toner amounts of CMYKSi toner for reproduction of a color sample image of a metallic color by using colorimetric values measured in colorimetric directions of three angles (15°, 45°, and 110°) is described below.

Figure 11:
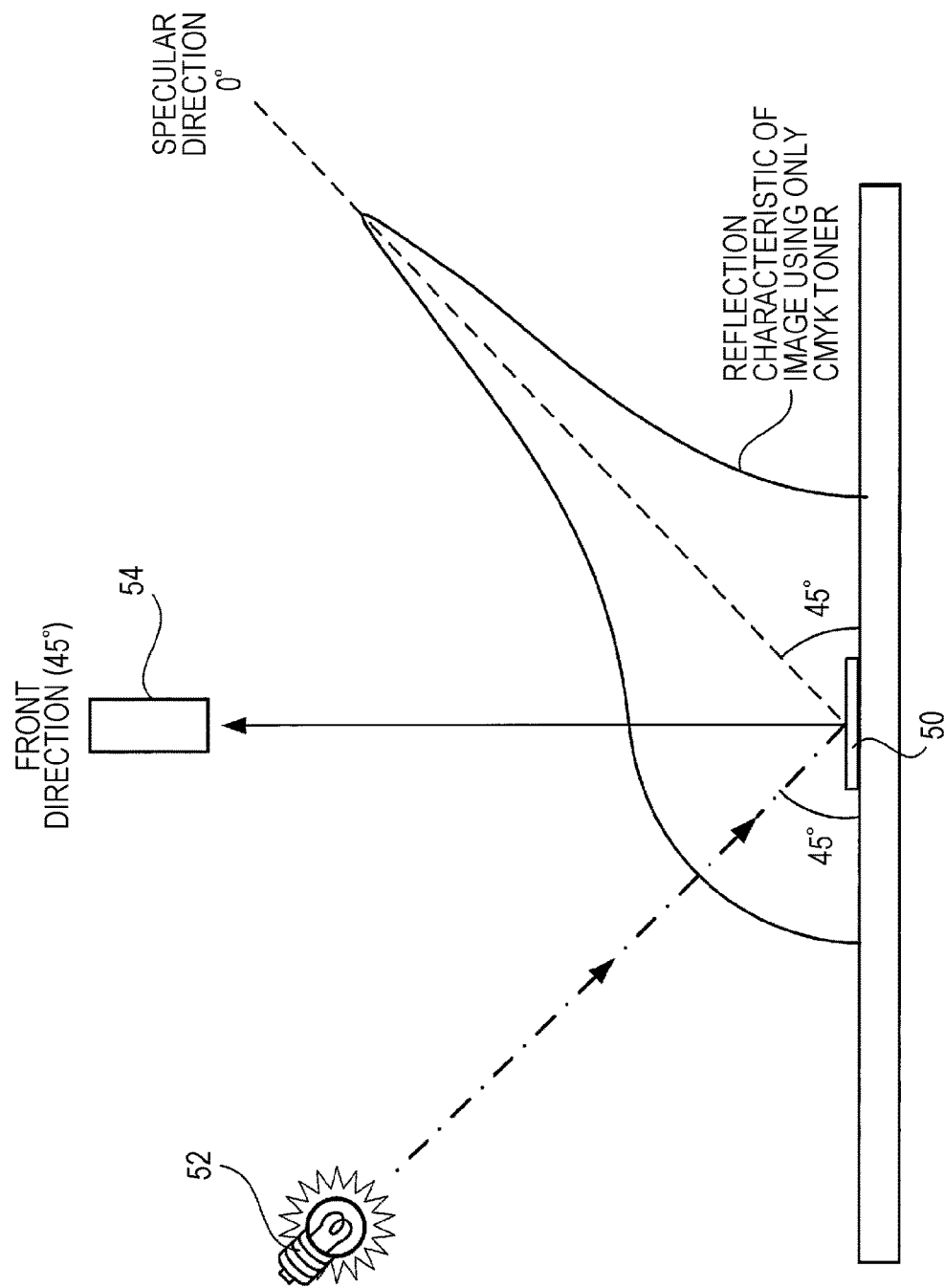
FIG. 11 is a view for explaining a method for measuring a color of a general image using only CMYK toner.

First, a colorimetric method for a general image using only CMYK toner is described with reference to FIG. 11. As illustrated in FIG. 11, a general image that does not include metallic-color toner and uses only CMYK toner has reflection characteristics such that a light amount in a specular direction is larger than light amounts in other directions, but light amounts of diffusion light in directions other than the specular direction are almost uniform. Accordingly, according to a general colorimetric method, an image to be measured 50 is obliquely irradiated with light emitted from the light source 52, and a color value in a front direction (45°) is measured by the colorimetric device 54.

Figure 12:
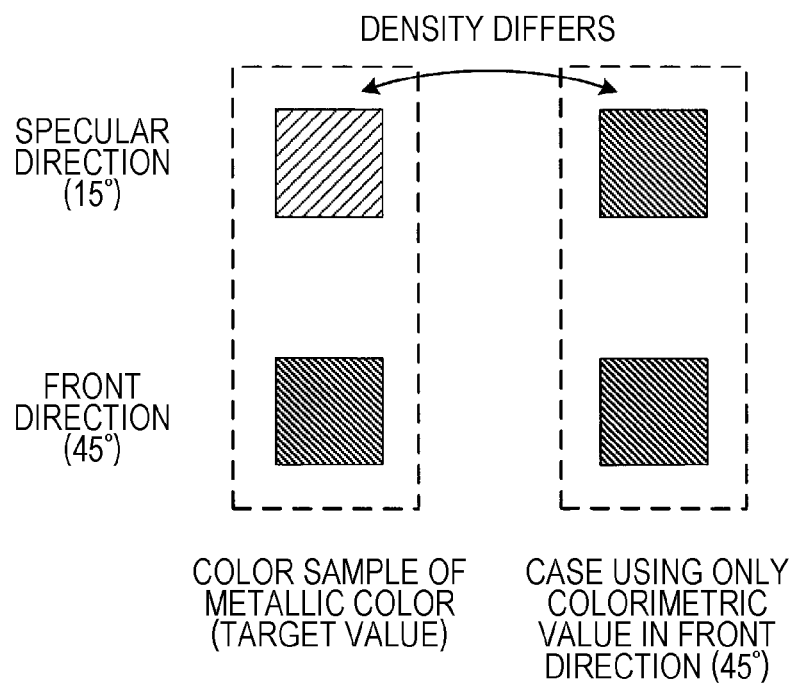
FIG. 12 is a view for explaining a problem that occurs in a case where a color sample image of a metallic color is reproduced by using only colorimetric values in a front direction (45°)

A problem that occurs in a case where a color sample image is reproduced by determining toner amounts of CMYKSi toner on the basis of colorimetric values obtained by measuring a color sample of a metallic color according to such a general colorimetric method is described with reference to FIG. 12.

In a case where a color sample of a metallic color is reproduced by using only colorimetric values in the front direction (45°), it is possible to almost reproduce a color shade in the front direction (45°). However, for example, a color shade viewed in the specular direction at 15° sometimes differs markedly. In the example illustrated in FIG. 12, a density of a reproduced image printed by using CMYKSi toner is higher than (i.e., differs from) a density of the actual color sample of the metallic color when viewed from the specular direction at 15°.

Under a general environment, an observed object is irradiated with light from various directions and reflect the light, and a person perceives a color of the object by looking at the various reflected light beams. Accordingly, even in a case where only a color viewed from a certain direction is reproduced, for example, in a metallic-color image whose color changes markedly depending on a viewing direction but in a case where a color shade viewed from other directions markedly differs from an actual image, a color shade viewed under actual lighting also changes.

Next, a difference in reflection characteristics between CMYK toner image and a color sample image of a metallic color is described with reference to FIG. 13.

A color sample image of a metallic color has higher lightness in the specular direction (15°) and lower lightness in the diffusion light direction (110°) than a CMYK toner image due to a difference in reflection characteristics.

For this reason, the color conversion device 40 according to the present exemplary embodiment determines amounts of CMYKSi toner that make an average of color differences in colorimetric directions small by using not only colorimetric values in the front direction (45°), but also colorimetric values in the specular direction (15°) and the diffusion light direction (110°) and thereby reproduces an image close to a color sample image when viewed from any direction.

Figure 14:
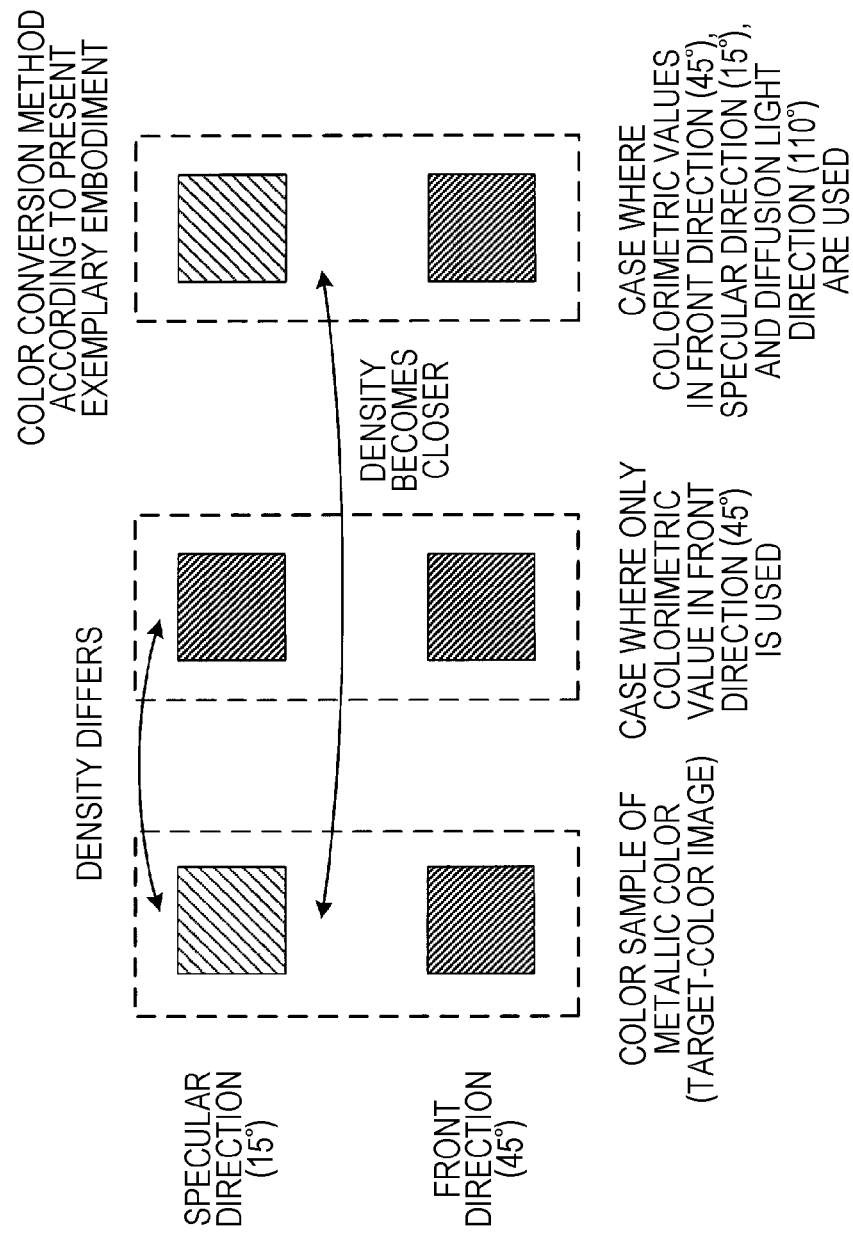
FIG. 14 illustrates an example of an image obtained in a case where a color sample image of a metallic color is printed by determining toner amounts by the color conversion method according to the exemplary embodiment of the present invention.

FIG. 14 illustrates an example of an image obtained in a case where a color sample image of a metallic color is printed by the image forming apparatus 10 according to the present exemplary embodiment that determines toner amounts by such a color conversion method.

As illustrated in FIG. 14, in a case where an image is printed by using CMYKSi toner of amounts determined by the color conversion method according to the present exemplary embodiment, not only a color shade viewed from the front direction (45°) but also a color shade viewed from the specular direction (15°) are close to the color sample image of the metallic color. Furthermore, although lightness of a color shade viewed from the diffusion light direction (110°) is slightly higher than that of the color sample image (not illustrated in FIG. 14), a density in the specular direction (15°) can be made close to that of the color sample image without making a color difference in the diffusion light direction (110°) large since toner amounts are determined by reflecting the color difference in the diffusion light direction (110°).

By thus determining amounts of CMYKSi toner by colorimetric measurement of a color sample image of a metallic color in plural colorimetric directions, it is possible to improve color reproducibility of an image printed by using the CMYKSi toner. In particular, it is possible to improve color reproducibility of a dense metallic color.

Figure 15:
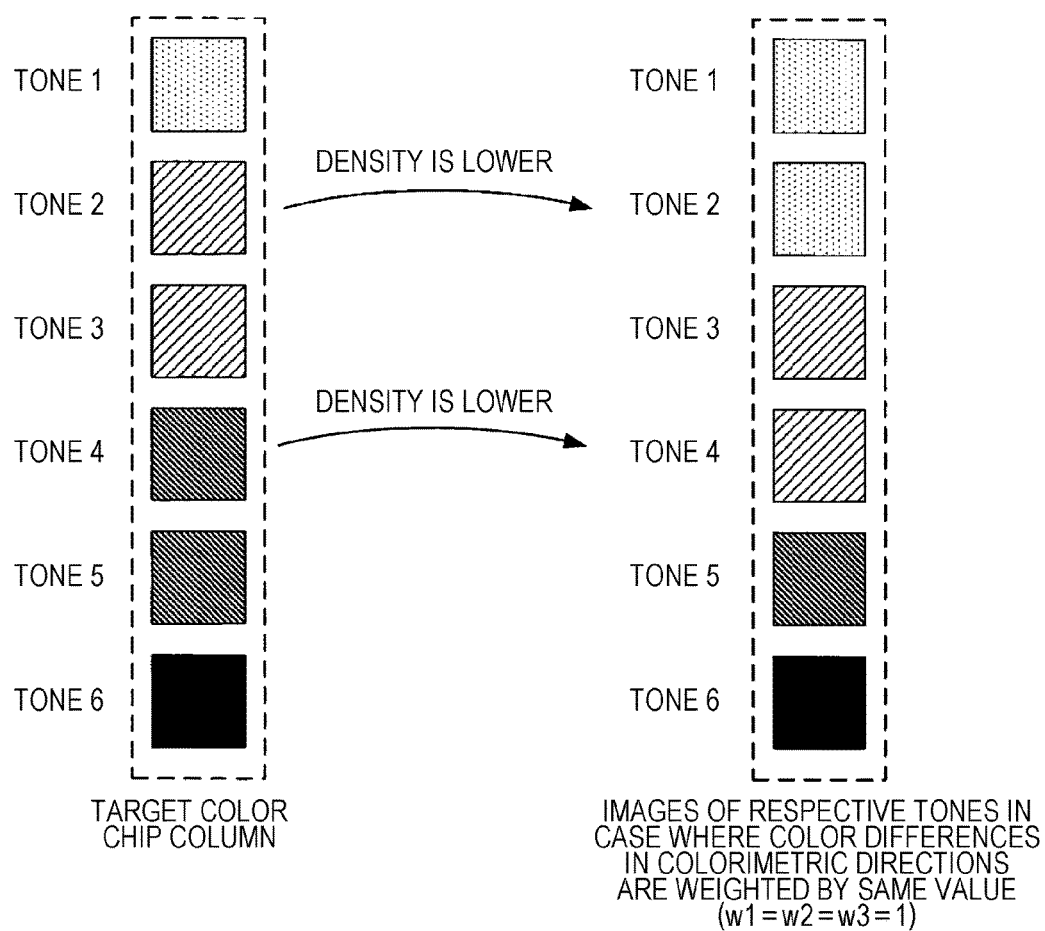
FIG. 15 illustrates an example of images of a metallic color of different tones reproduced by using CMYKSi toner in a case where weighting coefficients satisfy w1=w2=w3=1.

However, in a case where images of a metallic color of different tones as illustrated in FIG. 15 are reproduced by using CMYKSi toner, problems such as occurrence of tone jump or tone inversion in tone characteristics of a printed image of a metallic color sometimes occur instead of reproduction of original tone characteristics of a color sample.

A reason why smooth tone characteristics cannot be reproduced in a case where images of a metallic color are printed by using CMYKSi toner is described below.

Figure 13:
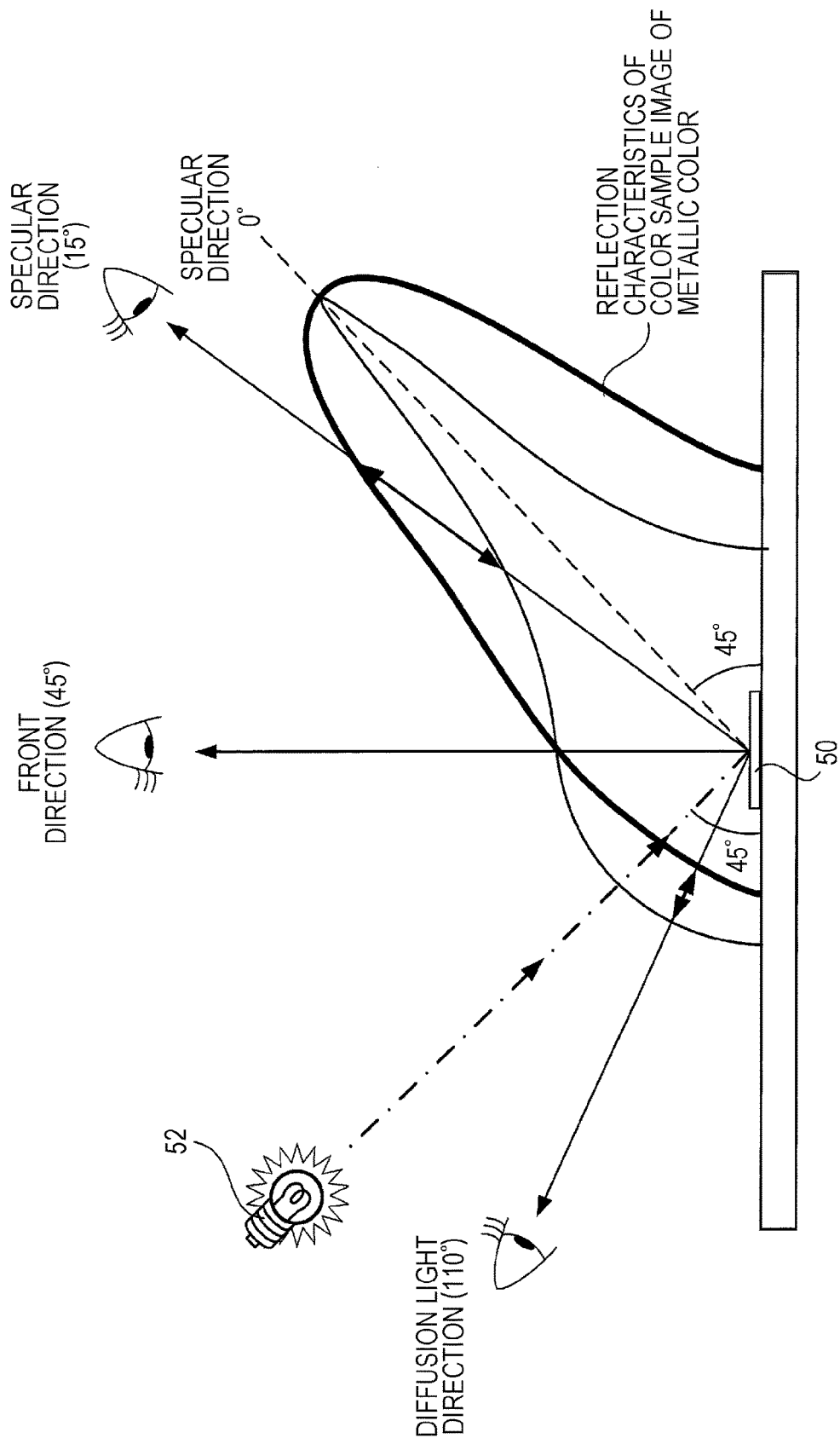
FIG. 13 is a view for explaining a difference in reflection characteristics between a CMYK toner image and a color sample image of a metallic color.
Figure 16:
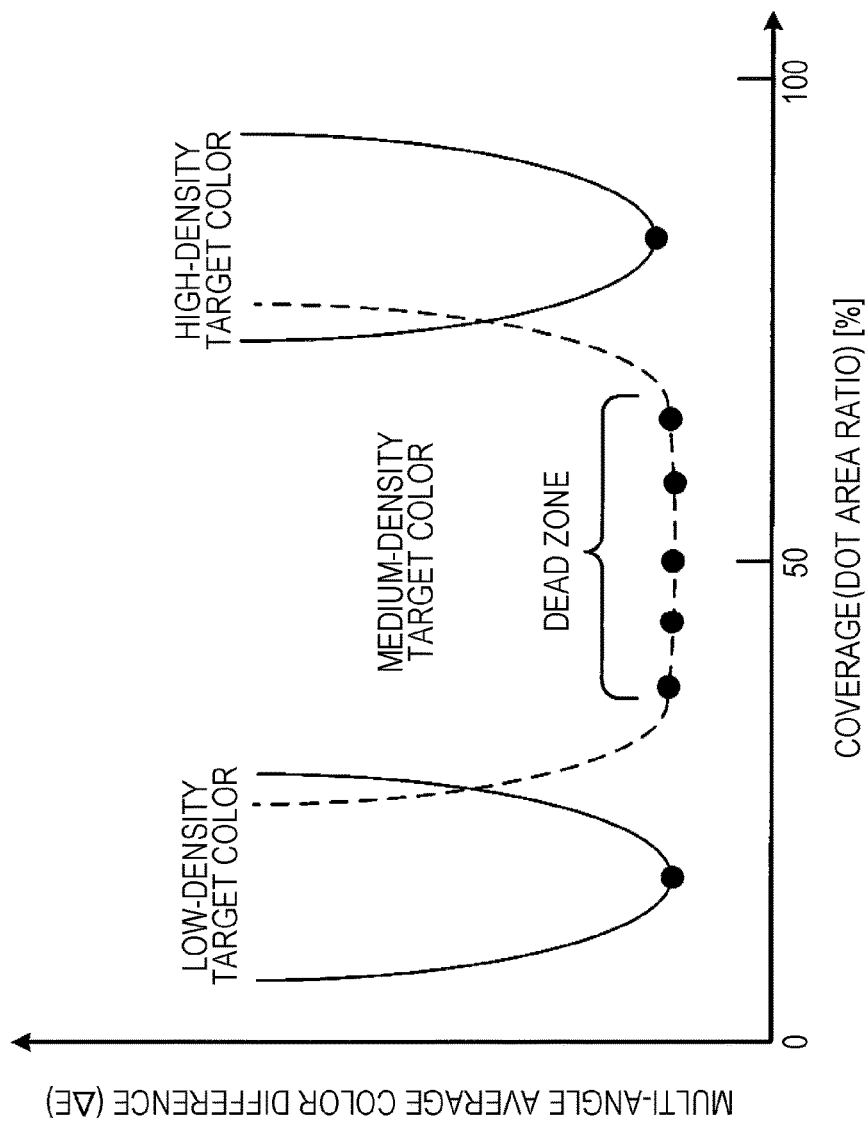
FIG. 16 is a view for explaining change characteristics of a multi-angle average color difference at different densities.

Since lightness in the specular direction (15°) is high in an image of a metallic color as illustrated in FIG. 13, the image tends to have a pale color since lightness becomes high as a whole in a case where toner amounts are determined so that an average of color differences in plural directions becomes small. In a target color of an intermediate density illustrated in FIG. 16, a dead zone in which a multi-angle average color difference does not change much even in a case where toner amounts (coverage) are changed is wide. In a high-density or low-density target color, such a dead zone is narrow, and toner amounts are uniquely determined by determining toner amounts that minimize a multi-angle average color difference. However, in the target color of the intermediate density, even in a case where toner amounts that minimize a multi-angle average color difference are determined, toner amounts are not uniquely determined and vary since the dead zone is wide as described above.

For such a reason, in a case where toner amounts are determined on the basis of colorimetric values obtained by colorimetric measurement of plural images of a metallic color of different tones from plural colorimetric directions, a density of an image of a halftone becomes low, and a tone suddenly changes in the middle, i.e., a tone jump occurs as a whole. In particular, such a problem is remarkable in a case where weighting coefficients in the respective colorimetric directions used to calculate an average of color differences are set to the same value (i.e., w1=w2=w3=1).

In view of this, the color conversion device 40 according to the present exemplary embodiment determines toner amounts so that tone characteristics of an image printed by using CMYKSi toner become smooth by changing the weighting coefficients (w1, w2, and w3) used to calculate an average (weighted average) of color differences in the respective colorimetric directions instead of using a constant value as the weighting coefficients (w1, w2, and w3). A specific example of such a method for determining toner amounts is described below.

First, the colorimetric value receiving unit 34 receives plural colorimetric values obtained by measurement of plural target-color images of a metallic color of different tones from plural directions.

Then, the converter 35 calculates, for each of the target-color images of the respective tones, a weighted average of color differences between colorimetric values of the target-color image in the colorimetric directions and color values in the colorimetric directions obtained from the color conversion model stored in the color conversion model storage unit 36 by using preset weighting coefficients, and selects a combination of weighting coefficients that makes tone characteristics closest to tone characteristics of the target-color images of the respective tones by changing the weighting coefficients used to calculate a weighted average of the color differences in the respective colorimetric directions when a combination of toner amounts that minimizes the weighted average of the color differences is determined.

Specifically, the converter 35 selects, for each of the target-color images of the respective tones, a combination in which weights for the color differences in the colorimetric directions (15° and 110°) other than the front direction (45°) are smallest among combinations of weighting coefficients in which a difference between a multi-angle average color difference, which is a simple average of the color differences in the plural colorimetric directions, and a weighted average of the color differences is within a preset value and selects, as a combination of weighting coefficients that makes tone characteristics closest to tone characteristics of the target-color images of the respective tones, a combination of weighting coefficients in which weights for the color differences in the colorimetric directions other than the front direction are largest among plural combinations of weighting coefficients selected for the target-color images of any tones.

Next, details of the aforementioned method for determining toner amounts are described with reference to the drawings.

Figure 17:
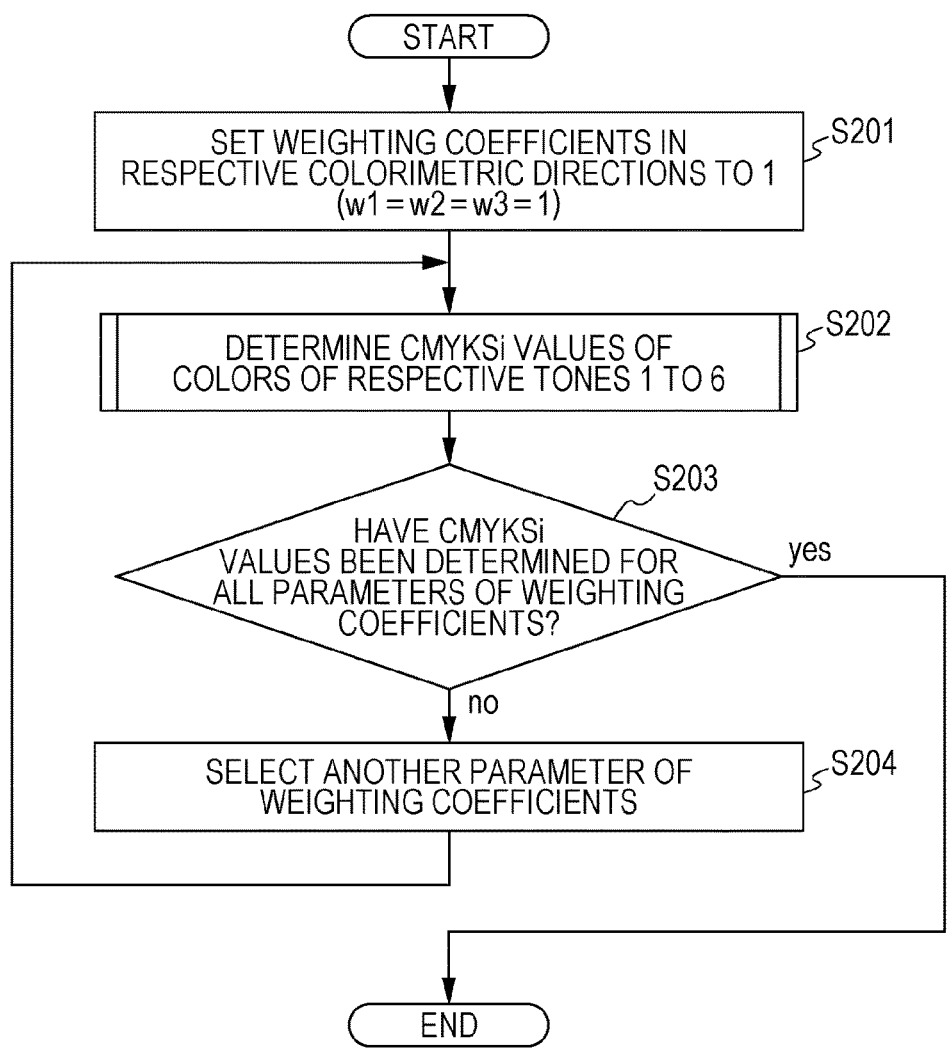
FIG. 17 is a flowchart for explaining processing for calculating, for each of tones, a weighted average of color differences by using each of plural combinations (parameters) of weighting coefficients.

First, processing for calculating, for each of the tones 1 to 6, weighted averages of color differences by using plural combinations (parameters) of weighting coefficients by referring to the flowchart of FIG. 17.

The converter 35 first sets the weighting coefficients w1, w2, and w3 in the respective colorimetric directions to 1 (Step S201).

Then, the converter 35 determines toner amounts of the respective CMYKSi colors for a color of an image of each of the tones 1 to 6 of a target color chip column like the one illustrated in FIG. 15 (Step S202). The color conversion method described with reference to the flowchart of FIG. 8 is used as the process for determining the toner amounts of the respective CMYKSi colors. Furthermore, a value of weighted average ΔE (WAVG) of color differences obtained when the toner amounts are determined is stored for each tone.

Then, the converter 35 repeats the process in Step S202 for each of preset plural combinations (parameters) of weighting coefficients (Steps S203 and S204).

Figure 18:
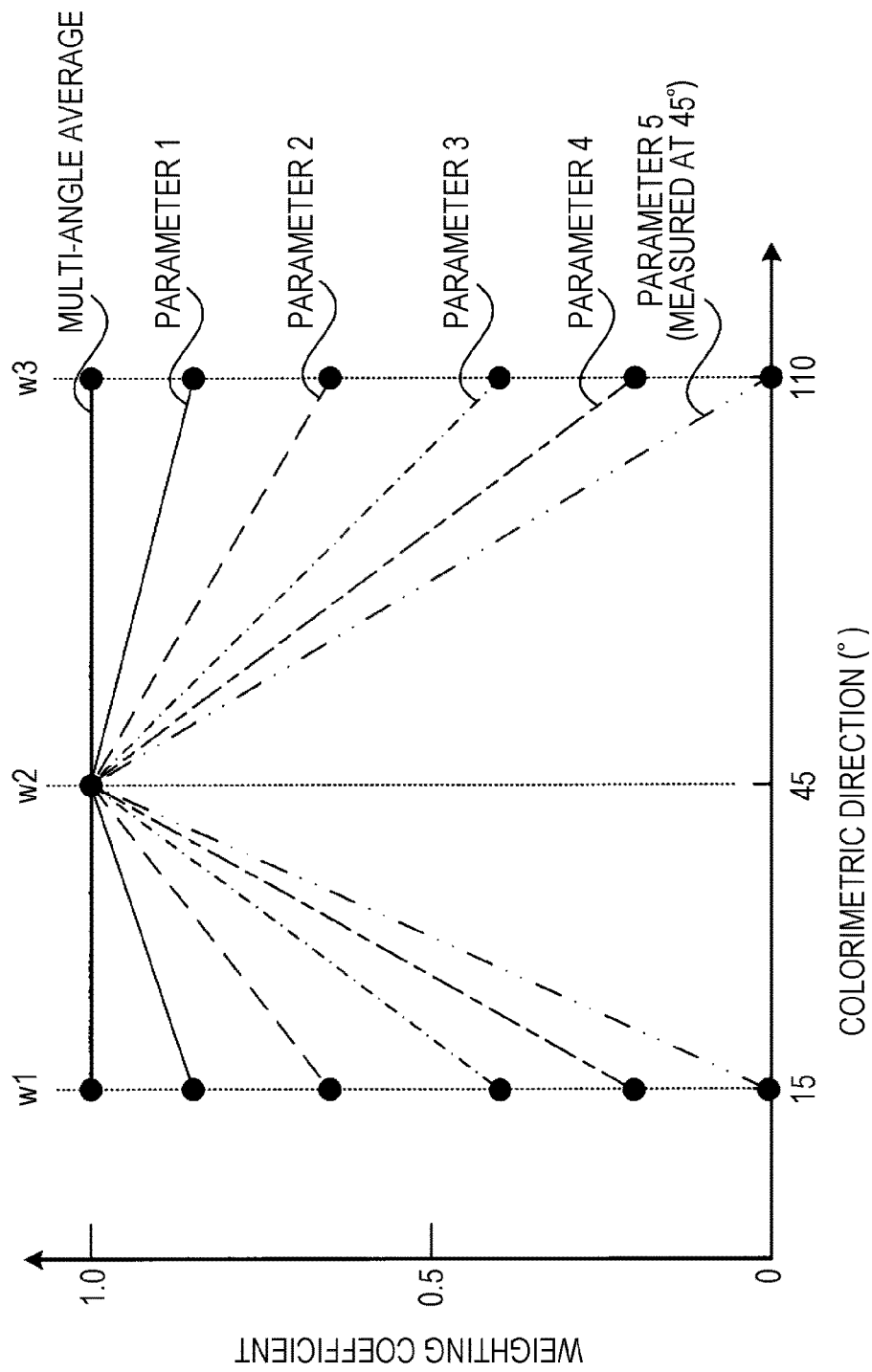
FIG. 18 is a view for explaining parameters having different values of weighting coefficients.

In this example, the converter 35 repeats the process six times in total (i.e., a case where w1=w2=w3=1 and cases of parameters 1 to 5 obtained by changing the weighting coefficients w1, w2, and w3 (see FIGS. 18 and 19). In the case where w1=w2=w3=1, a simple average of the color differences in the respective colorimetric directions is obtained and is therefore hereinafter referred to as a multi-angle average.

As is clear from FIGS. 18 and 19, the weighting coefficient w2 for the color difference in the direction of 45° is set to 1 in all of the parameters, and the weighting coefficient w1 for the color difference in the direction of 15° and the weighting coefficient w3 of the color difference in the direction of 110° are gradually changed from 1 to a smaller value.

Accordingly, in the parameter 5, w1=w3=0, and the color difference in the direction of 45° is used as a weighted average as it is.

Figure 21:
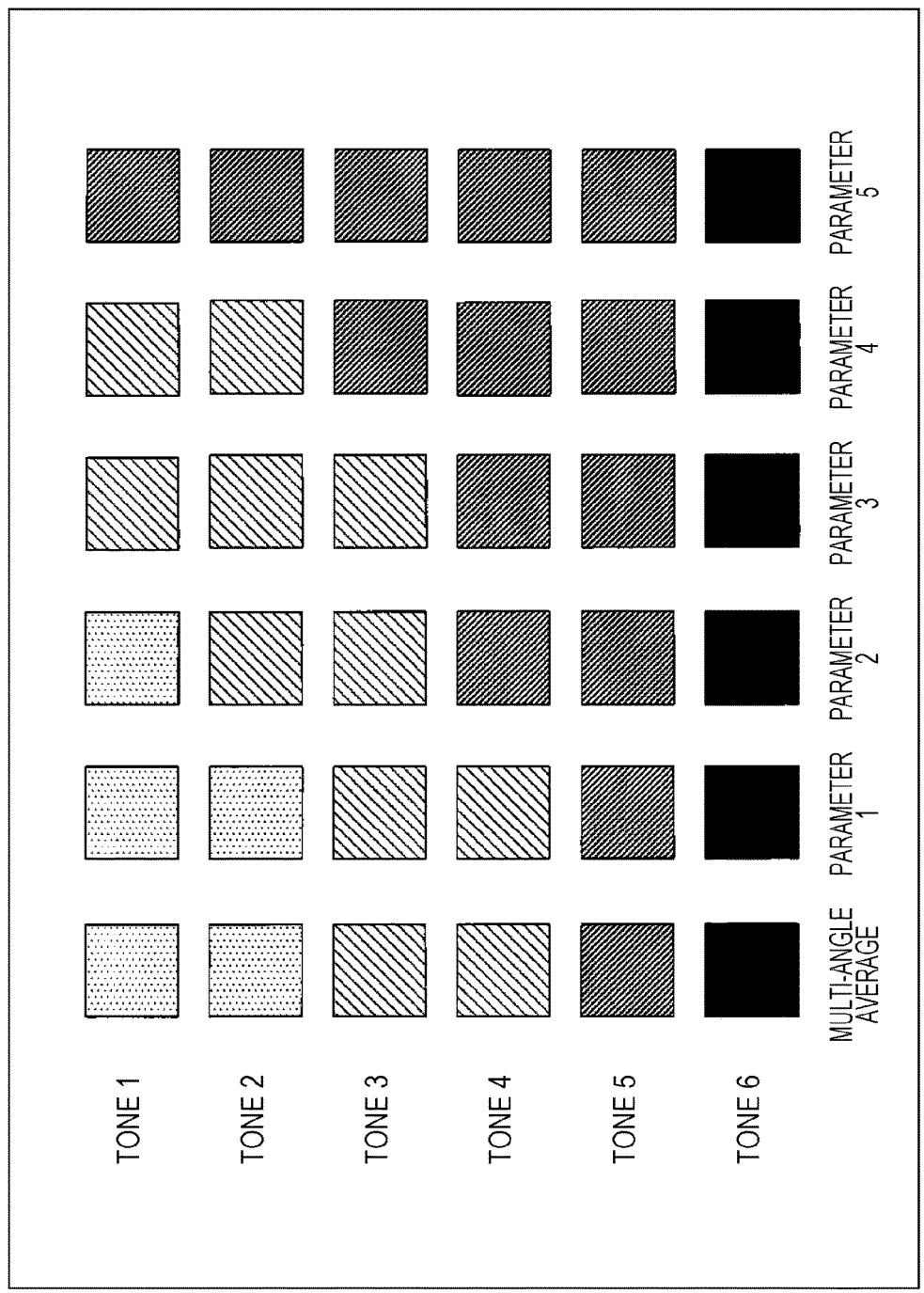
FIG. 21 illustrates an example of densities of color chip columns obtained in a case where toner amounts are determined by calculating weighted averages by using the parameters of weighting coefficients.

FIG. 20 illustrates an example of weighted averages ΔE (WAVG) of color differences thus obtained by using the parameters. FIG. 21 illustrates an example of densities of color chip columns obtained in a case where toner amounts are determined by calculating weighted averages ΔE (WAVG) by using the parameters of weighting coefficients.

As is clear from FIG. 21, densities of images of the respective tones become higher as the values of the weighting coefficients w1 and w3 become smaller (in the order of the multi-angle average, the parameter 1, the parameter 2, . . . ). This is because colorimetric values including high lightness in the specular direction (15°) are reflected less in determination of toner amounts and colorimetric values including low lightness in the front direction (45°) are reflected more in determination of toner amounts as the values of the weighting coefficients w1 and w3 become small.

Figure 22:
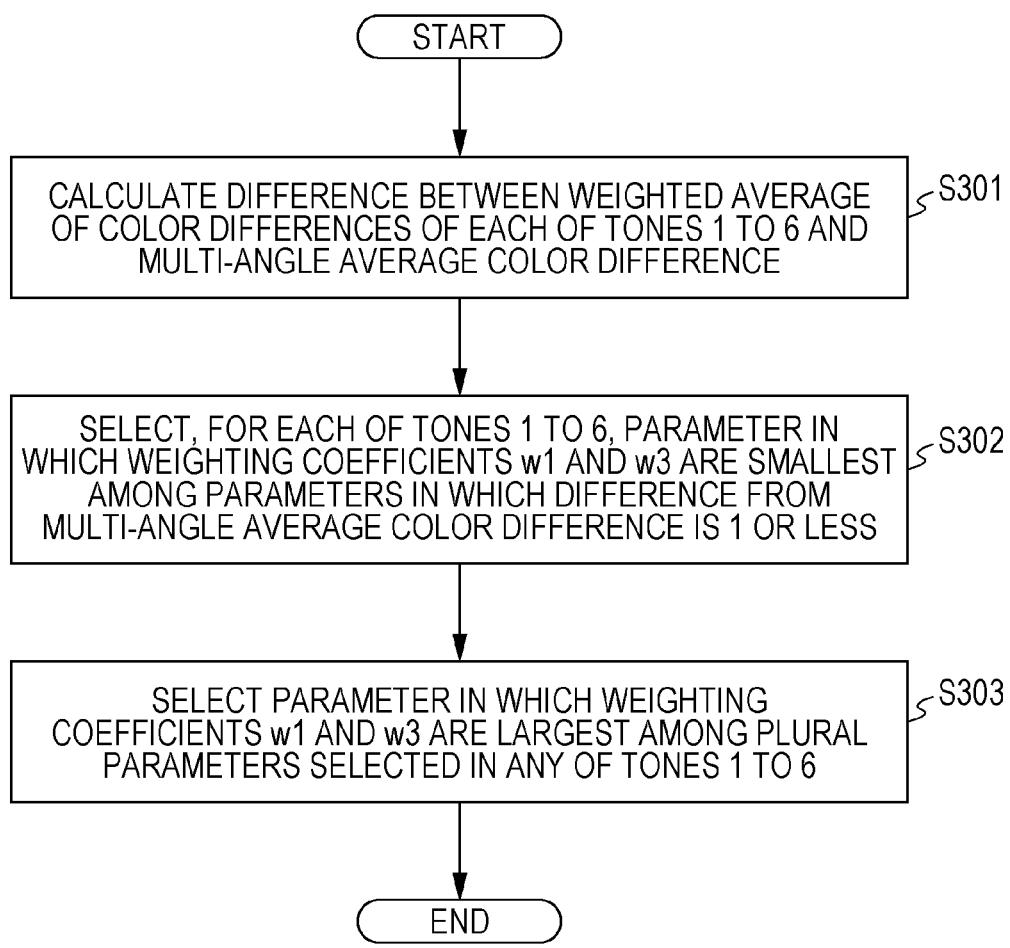
FIG. 22 is a flowchart for explaining a method for selecting a parameter that makes tone characteristics smooth by using weighted averages of color differences calculated by using the parameters of weighting coefficients illustrated in FIG. 20.

Next, a method for selecting a parameter that makes tone characteristics smooth by using the weighted averages ΔE (WAVG) of the color differences calculated by using the parameters of the weighting coefficients as illustrated in FIG. 20 is described with reference to the flowchart of FIG. 22.

First, the converter 35 calculates a difference between a multi-angle average color difference (an average of the color differences obtained in a case where w1=w2=w3=1) and a weighted average ΔE (WAVG) of the color differences (see FIG. 20) calculated for each of the tones 1 to 6 by using each of the parameters (Step S301).

FIG. 23 illustrates an example of differences between the multi-angle average color difference and the weighted-average color differences (the weighted averages ΔE (WAVG) of the color differences) calculated by using the other parameters.

Next, the converter 35 selects, for each of the tones 1 to 6, a parameter in which the weighting coefficients w1 and w3 are smallest among parameters in which a difference from the multi-angle average color difference is equal to or smaller than a preset value (e.g., equal to or smaller than 1) (Step S302).

That is, the converter 35 selects, in each tone, a parameter in which the weighting coefficients w1 and w3 are smallest as compared with the weighting coefficient w2 (i.e., a density of a halftone is high) among parameters in which a difference from a multi-angle average color difference is equal to or smaller than 1 (i.e., a change from a multi-angle average is within a predetermined range).

For example, in the tone 1, the difference from the multi-angle average color difference is 0.001 and 0.010, which are smaller than 1, in the parameter 1 and the parameter 2, respectively. In the parameter 1, w1 and w3 are 0.85, and in the parameter 2, w1 and w3 are 0.65. Accordingly, the parameter 2 in which the weighting coefficients w1 and w3 are smaller is selected.

FIG. 24 illustrates a result of selecting, in each tone, a parameter in which a difference between the multi-angle average color difference and a weighted-average color difference is equal to or smaller than 1 and the weighting coefficients w1 and w3 are smallest. In FIG. 24, the selected parameter is shaded in each tone.

Finally, the converter 35 selects a parameter in which the weighting coefficients w1 and w3 are largest among plural parameters selected in any of the tones 1 to 6 (Step S303).

In the example illustrated in FIG. 24, the parameter 2 is selected in the tones 1 and 2, the parameter 1 is selected in the tone 3, and the parameter 5 is selected in the tones 4, 5, and 6.

Accordingly, as illustrated in FIG. 25, the converter 35 selects the parameter 1 in which the weighting coefficients w1 and w3 are largest among the parameters 1, 2, and 5.

Figure 26:
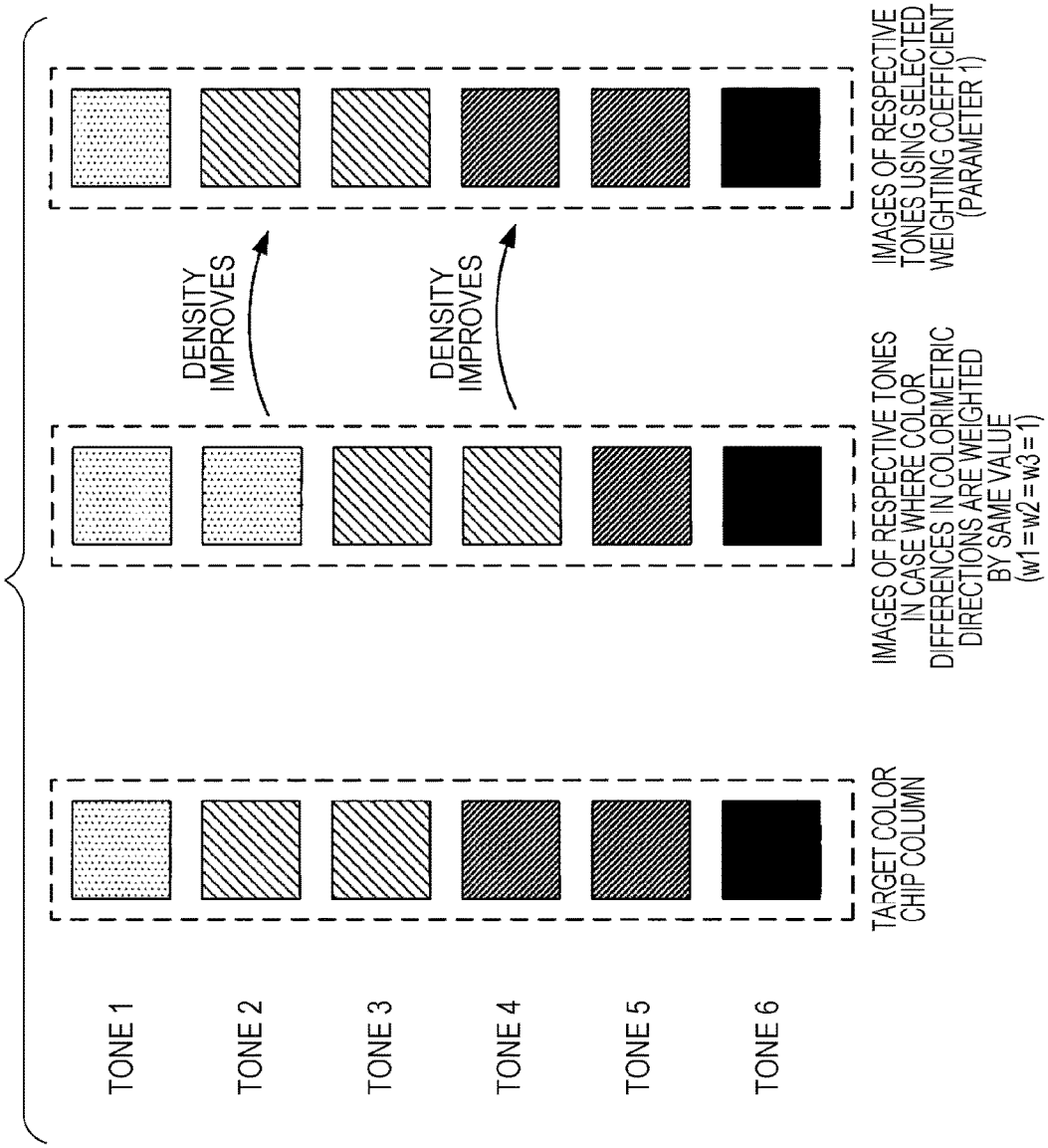
FIG. 26 illustrates an example of images of respective tones based on toner amounts determined by using weighting coefficients of the selected parameter.

FIG. 26 illustrates an example of images of the respective tones based on toner amounts determined by using the weighting coefficients of the parameter 1 thus selected.

As is clear from FIG. 26, in a case where the toner amounts are determined by using the weighting coefficients (w1=w3=0.85 and w2=1) of the parameter 1, densities of the images of the tones 2 and 4 become higher and closer to the densities of the images in the target color chip column than in a case where the toner amounts are determined while using the same weighting coefficient (w1=w2=w3=1) for the color differences in the respective colorimetric directions.

Figure 27:
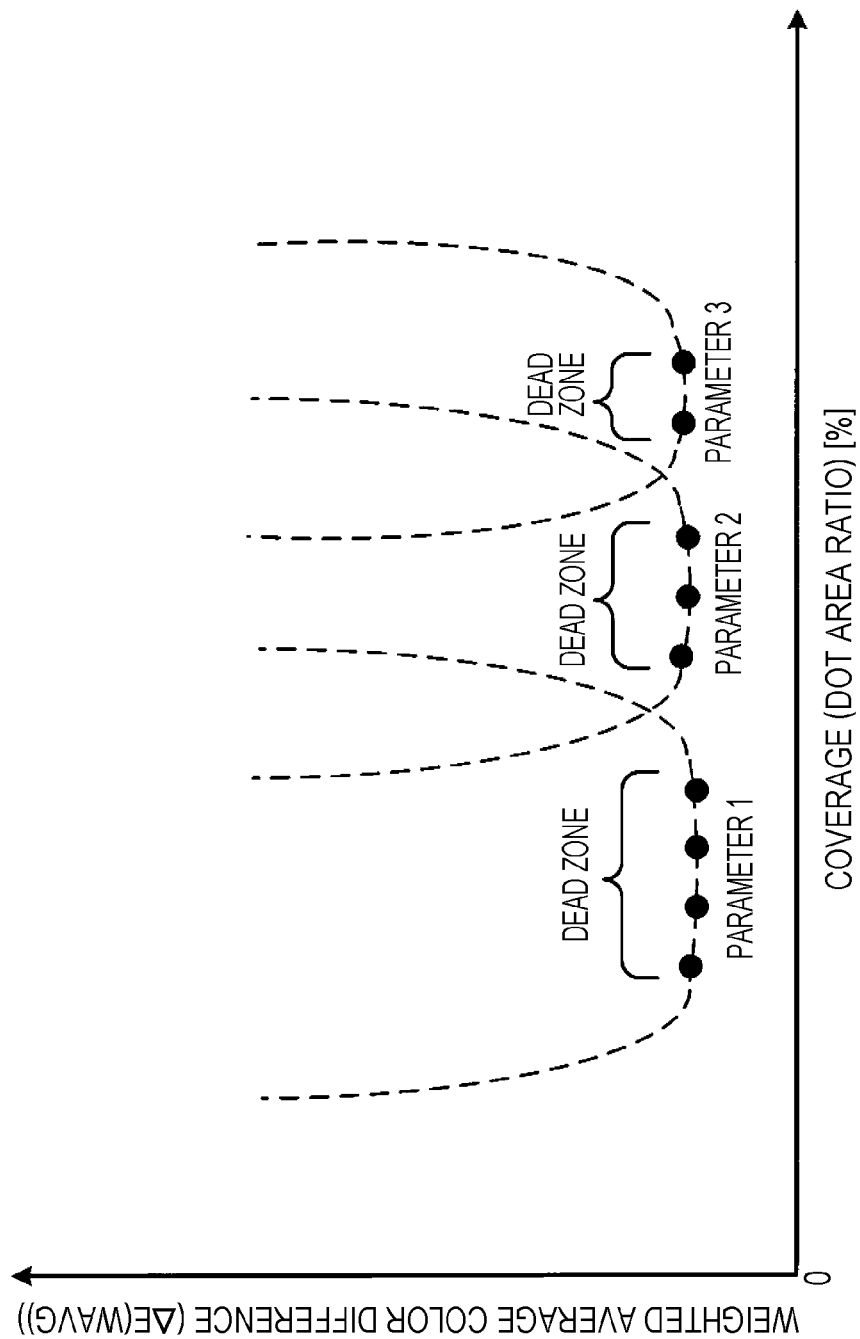
FIG. 27 is a view for explaining that a width of a dead zone becomes narrower as a parameter of weighting coefficients changes.

As the values of w1 and w3 become smaller from the multi-angle average in which the weighting coefficients w1, w2, and w3 in the respective colorimetric directions are equal to the parameters 1, 2, 3, . . . , not only a density of an image of a halftone becomes higher, but also a width of a dead zone becomes narrower as illustrated in FIG. 27. It is therefore considered that tone characteristics become smoother in a case where toner amounts are determined by selecting any of parameters in which values of the weighting coefficients w1 and w3 are smaller than w2 than in a case where toner amounts are determined based on a multi-angle average.

The converter 35 may make tone characteristics of the images of the tones 1 to 6 smoother by performing smoothing processing using a smoothing filter. Specifically, the converter 35 may sequentially determine a toner amount of a target-color image other than target-color images of densest or palest tones by calculating an average of the toner amount of the target-color image and toner amounts of target-color images of other tones of adjacent tone characteristics.

Figure 28:
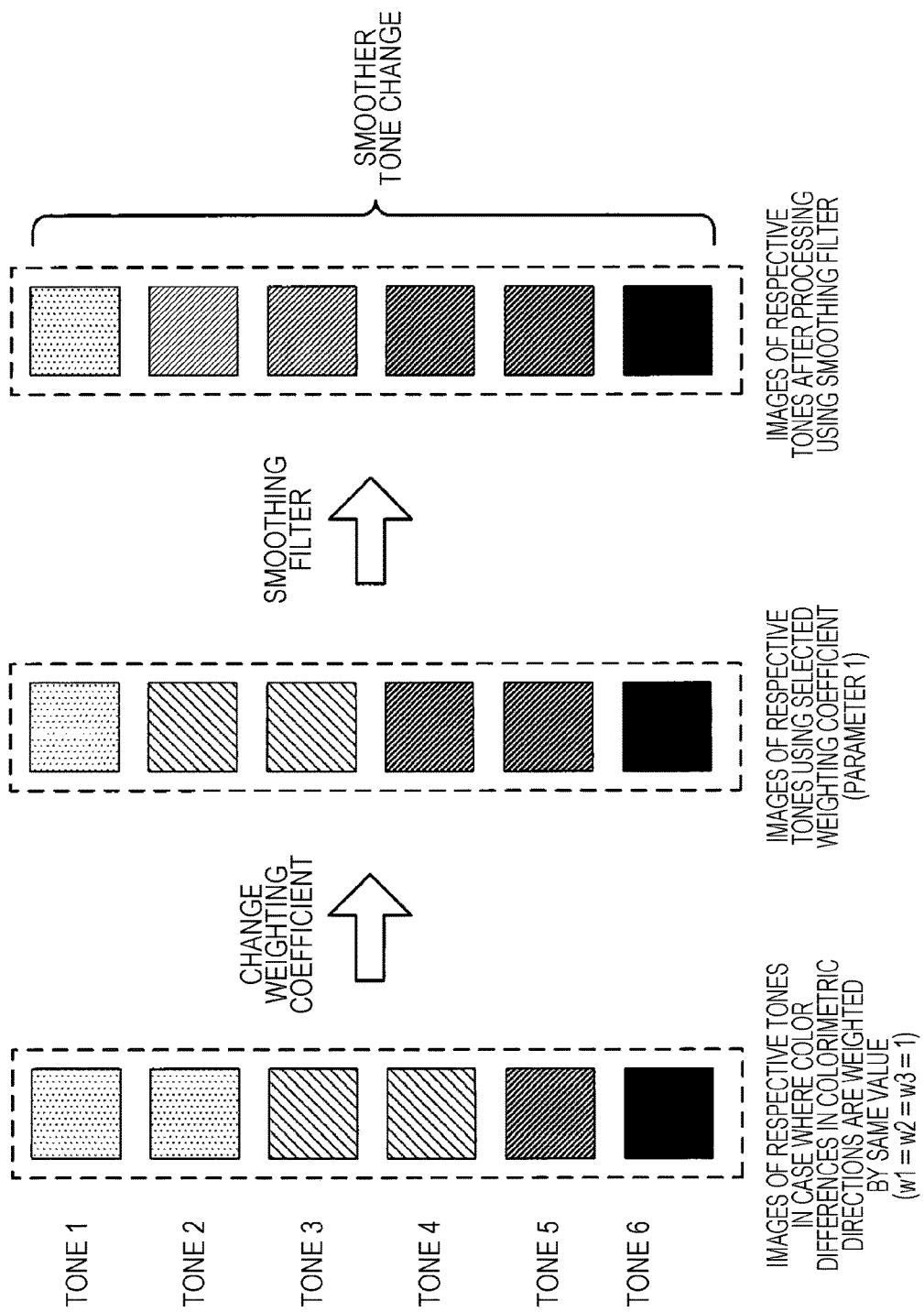
FIG. 28 illustrates an example of images of tones obtained in a case where processing using a smoothing filter is performed.

FIG. 28 illustrates an example of images of the respective tones 1 to 6 obtained in a case where the processing using the smoothing filter is performed. As is clear from FIG. 28, tone characteristics of images obtained by performing the processing using the smoothing filter on the images obtained in a case where the parameter 1 is used as weighting coefficients become smoother.

Figure 29:
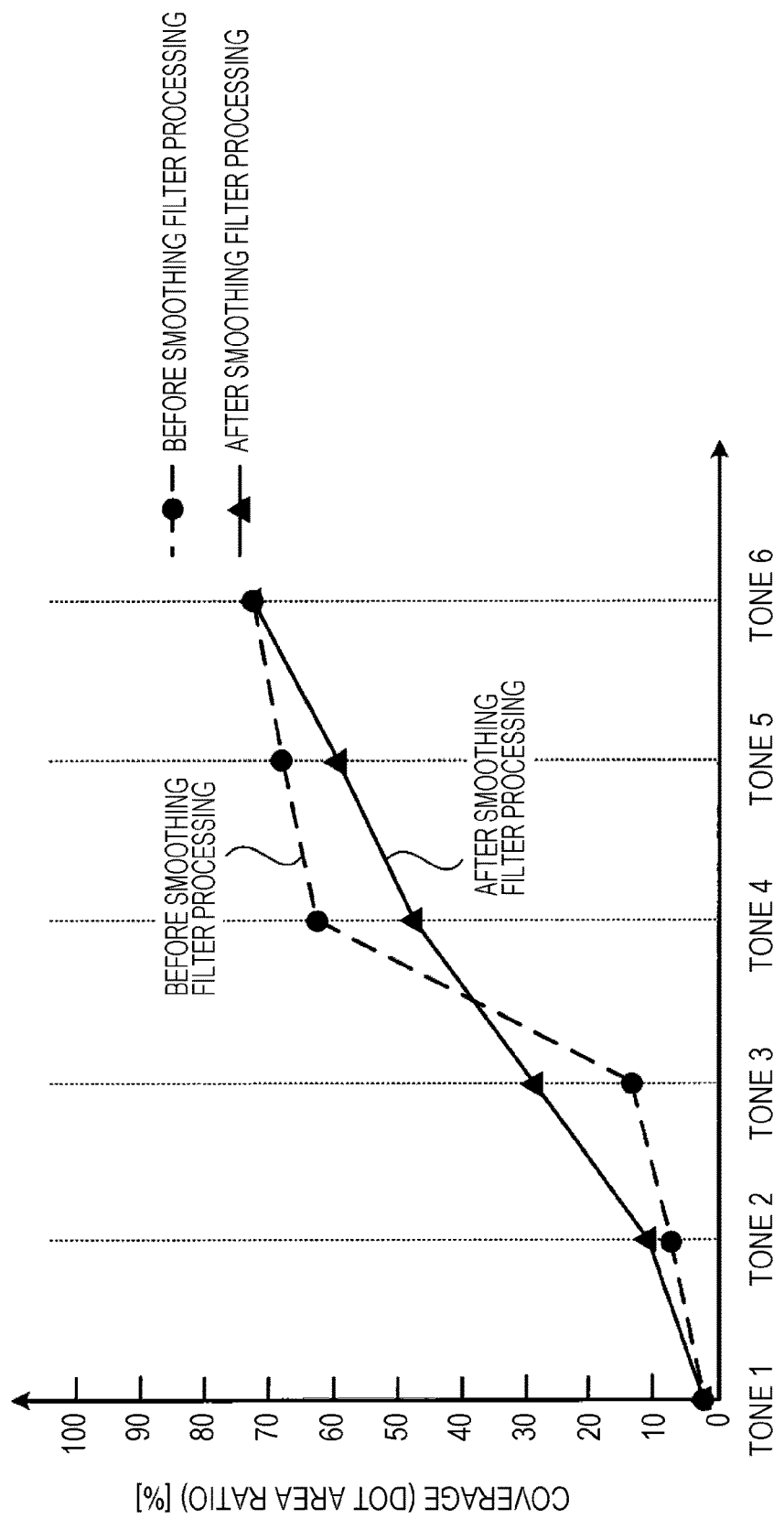
FIG. 29 is a graph of a change of tone characteristics caused by the smoothing filter.

FIG. 29 is a graph of a change of tone characteristics caused by the smoothing filter. As is clear from FIG. 29, a tone change from the tone 1 to the tone 6 becomes smoother as a result of the processing using the smoothing filter.

As a specific calculation method of this processing using the smoothing filter, a moving-average arithmetic method can be used. Specifically, for example, a toner amount of the tone 2 may be used as an average of toner amounts of the tomes 1, 2, and 3, a toner amount of the tone 3 may be used as an average of toner amounts of the tones 2, 3, 4, . . . . As for the tone 6 having the highest density and the tone 1 having the lowest density, original toner amounts are maintained without being changed.

A case where a parameter that makes tone characteristics smooth is automatically selected from among plural parameters of the weighting coefficients by the converter 35 has been described. Instead of such a parameter selection method, images of each parameter may be output by the output unit 37, and a user may select a parameter that makes tone characteristics smoothest.

In this case, the output unit 37 outputs, on a sheet of paper, color chip columns of target-color images of plural toners obtained by changing weighting coefficients used for calculation of a weighted average of color differences in respective colorimetric directions.

The converter 35 need just select a combination (parameter) of weighting coefficients that makes tone characteristics closest to tone characteristics of target-color images of the respective tones on the basis of a user's input operation referring to the color chip columns of the target-color images of the plural toners output by the output unit 37.

Figure 30:
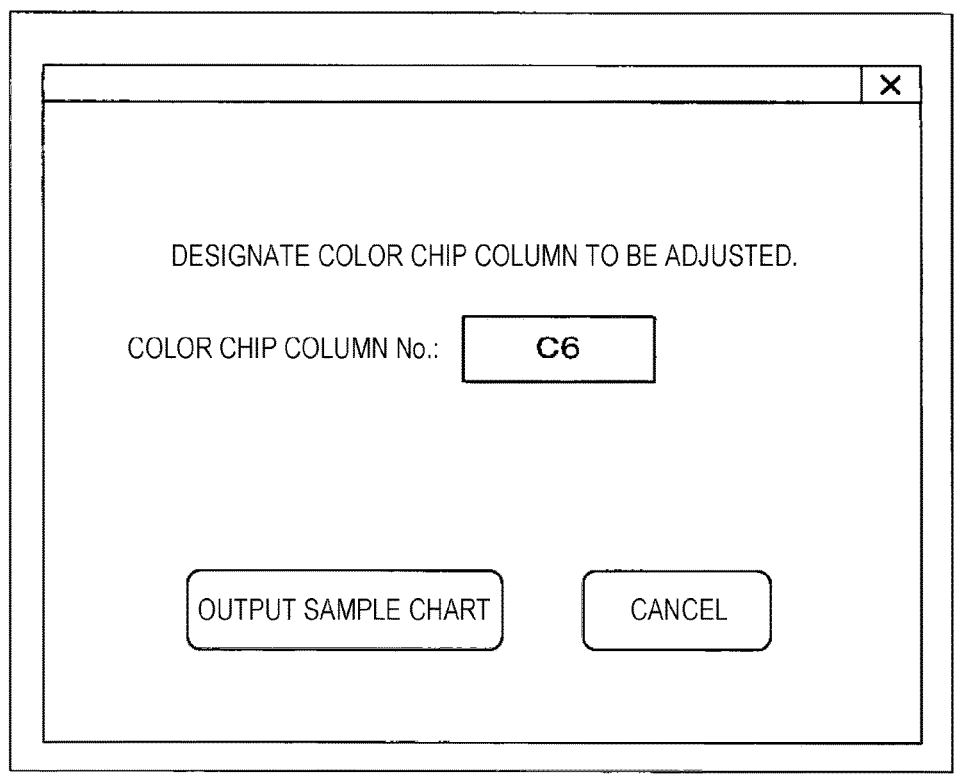
FIG. 30 illustrates an example of a screen displayed in a case where a combination (parameter) of weighting coefficients that makes tone characteristics closest to tone characteristics of target-color images of respective tones is selected on the basis of a user's input operation.
Figure 31:
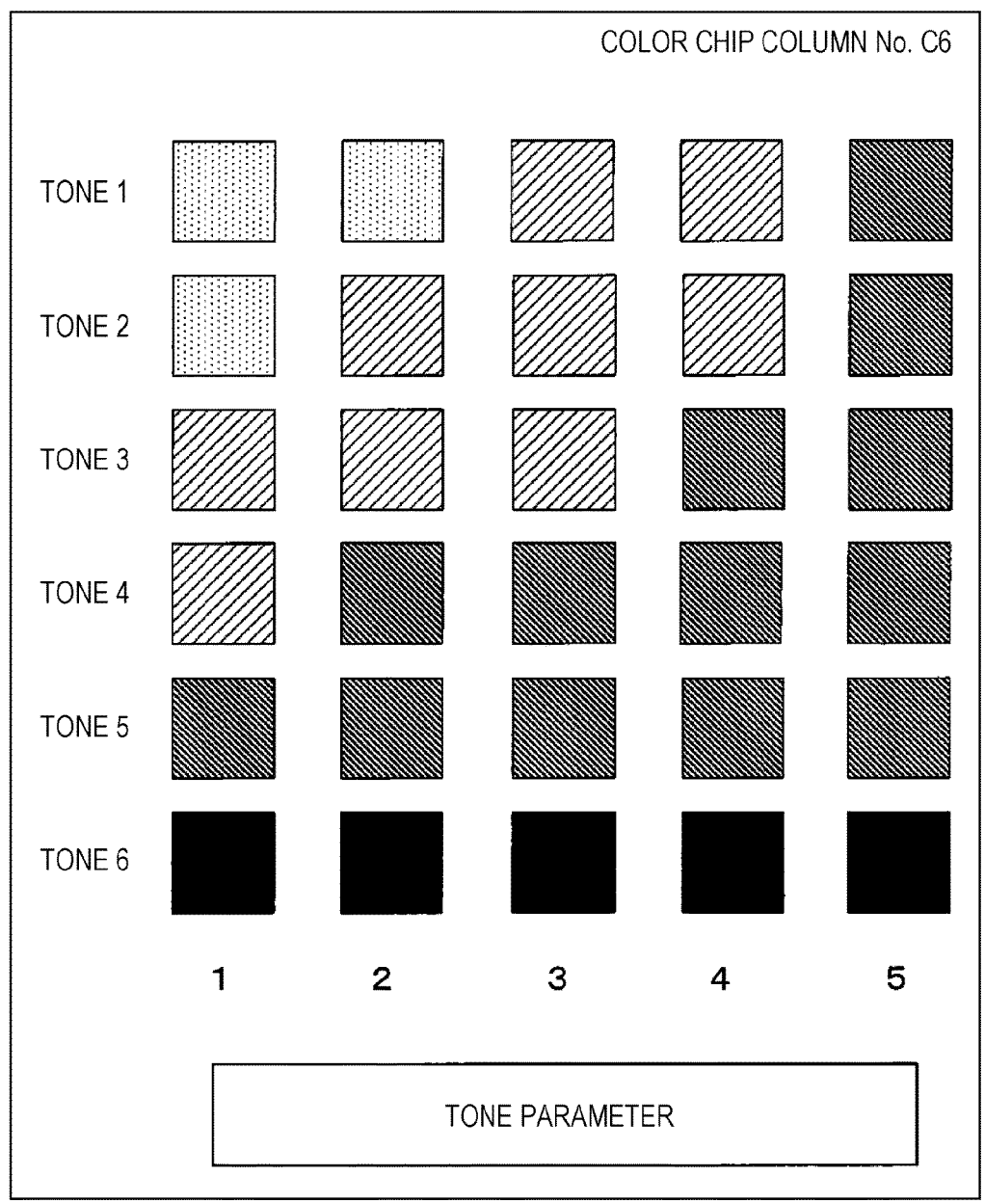
FIG. 31 illustrates an example of a sample chart output in a case where a user selects a parameter of weighting coefficients.

FIG. 30 illustrates an example of a screen displayed in a case where such processing is performed. FIG. 30 illustrates an example of a screen displayed in a case where a user enters a number of a color chip column for which the user wants to adjust a parameter. FIG. 31 illustrates an example of a sample chart output in a case where the user enters a number of a color chip column for which the user wants to adjust a parameter and operates an "output sample chart" button. In FIG. 31, images of the respective tones are output on a sheet of paper for each of the parameters 1 to 5 of the weighting coefficients.

Figure 32:
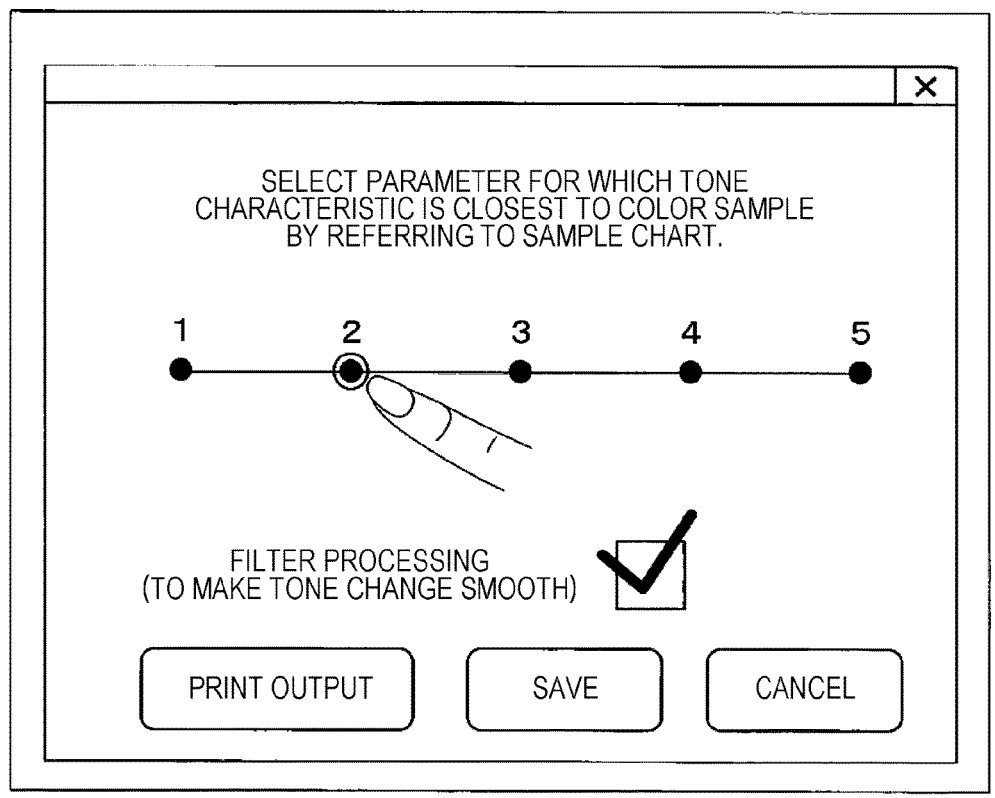
FIG. 32 illustrates an example of a screen displayed in a case where a user enters a selected parameter.

The user selects a number of a parameter for which the user feels that tone characteristics are closest to tone characteristics of a color chip example of a color sample by referring to the sample chart illustrated in FIG. 31 and enters the number of the parameter, for example, on a screen illustrated in FIG. 32.

FIG. 32 illustrates an example of a screen displayed in a case where the user selects and enters the parameter 2. The user may be allowed to select whether or not to perform the processing using the smoothing filter at this timing.

Although a case where a parameter of weighting coefficients for plural images of different densities is selected has been described, a parameter of weighting coefficients may be determined on the basis of a user's operation in a case where a color of a single color-sample image is reproduced.

Figure 33:
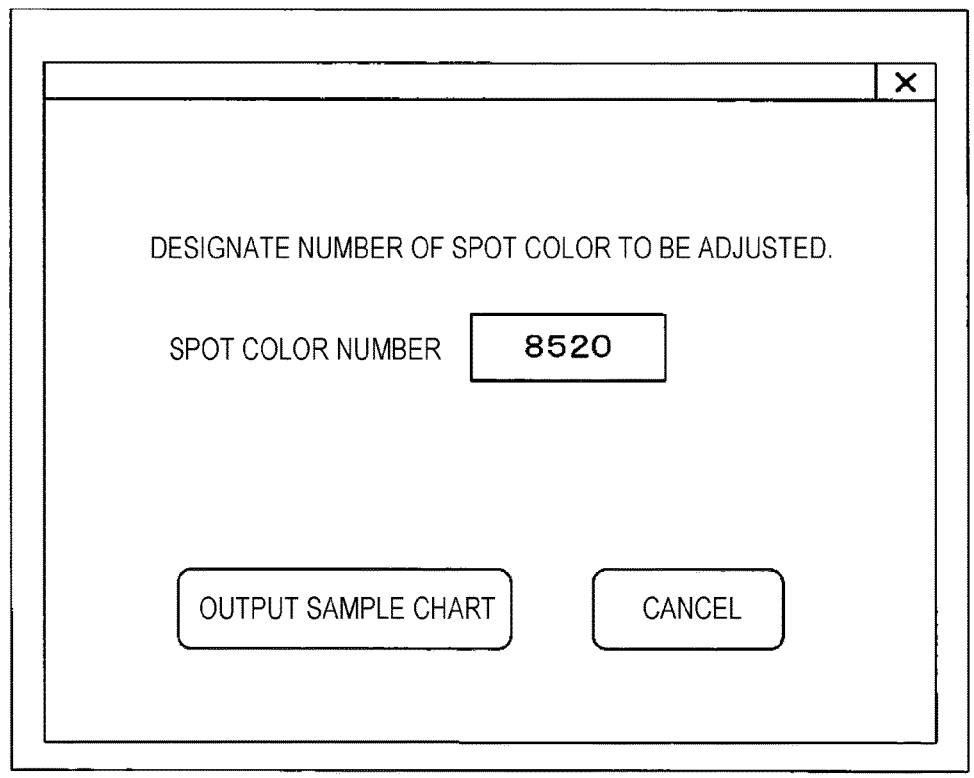
FIG. 33 illustrates an example of a screen displayed in a case where a combination (parameter) of weighting coefficients that makes a color closest to a color of target-color images is selected on the basis of a user's input operation.
Figure 34:
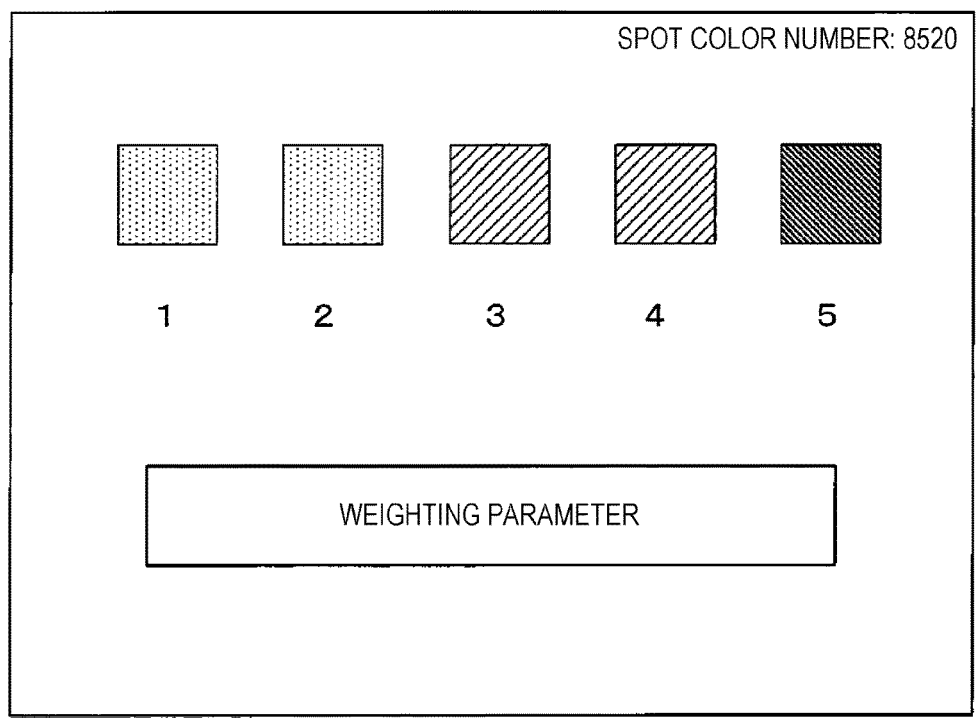
FIG. 34 illustrates an example of a sample chart output in a case where a user selects a parameter of weighting coefficients.

FIG. 33 illustrates an example of a screen displayed in a case where such processing is performed. FIG. 33 illustrates an example of a screen displayed in a case where a user enters a spot color number of a spot color for which the user wants to adjust a parameter. FIG. 34 illustrates an example of a sample chart output in a case where the user enters a spot color number of a spot color for which the user wants to adjust a parameter and operates an "output sample chart" button. In FIG. 34, an image formed on the basis of determined toner amounts is output on a sheet of paper for each of the parameters 1 to 5 of weighting coefficients.

Figure 35:
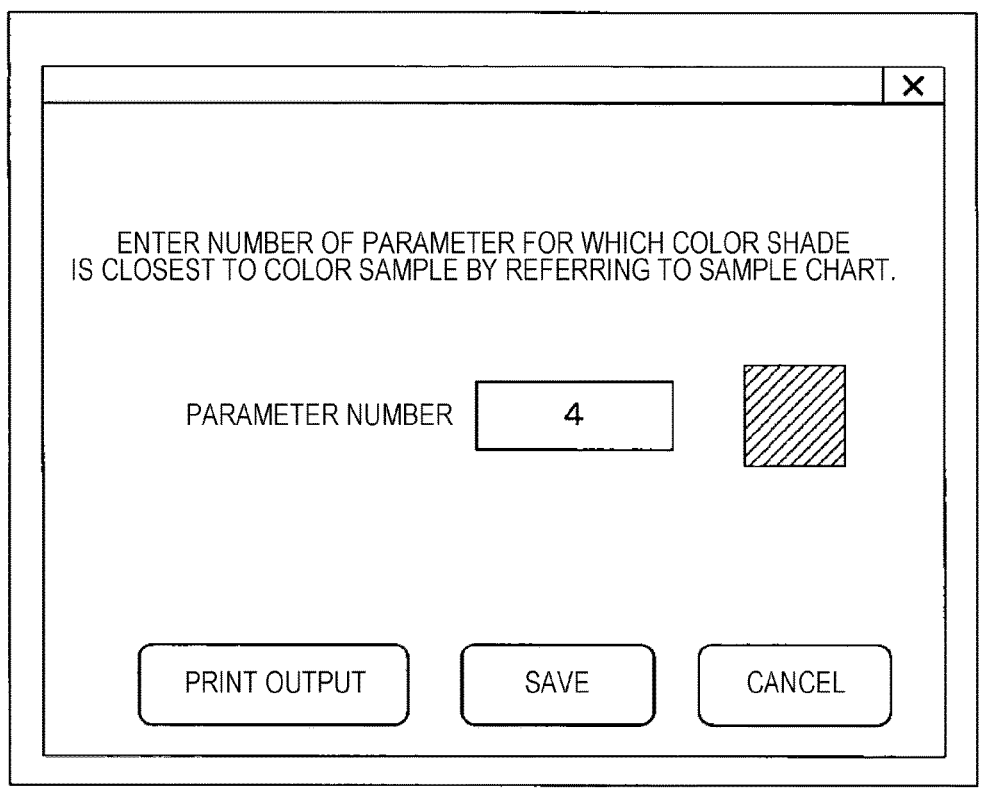
FIG. 35 illustrates an example of a screen displayed in a case where a user enters a selected parameter.

The user selects a number of a parameter for which the user feels that a color is closest to the color of the color sample by referring to the sample chart illustrated in FIG. 34 and enters the number of the parameter, for example, on a screen illustrated in FIG. 35. FIG. 35 illustrates an example of a screen displayed in a case where the user selects and enters the parameter 4.

Although a case where toner amounts of respective colors including silver toner are calculated by using colorimetric values in colorimetric directions of three angles, i.e., the specular direction (15°), the front direction (45°), and the diffusion light direction (110°) has been described above, the toner amounts may be calculated by using colorimetric values in colorimetric directions of multiple angles of three or more, for example, four angles or five angles. For example, a case where a color of an image to be measured 50 is measured in colorimetric directions of five angles, i.e., a specular direction (15°), a specular direction (25°), a front direction (45°), a diffusion light direction (75°), and a diffusion light direction (110°) is illustrated in FIG. 36.

Use of the colorimetric values in the colorimetric directions of the five angles obtained by the colorimetric method illustrated in FIG. 36 also makes it possible to calculate toner amounts of respective colors including silver toner by a method similar to the method described above.

That is, toner amounts of respective colors may be calculated by using colorimetric values of a target-color image measured in a direction (25°) closer to the specular direction (15°) than to the front direction (45°) and colorimetric values of the target-color image measured in a diffusion light direction (75°) between the front direction (45°) and an irradiation direction of the light source 52 in addition to colorimetric values in the specular direction (15°), the front direction (45°), and the diffusion light direction (110°). Furthermore, colorimetric values measured in a colorimetric direction other than the colorimetric directions illustrated in FIG. 36 may be used.

A color shade viewed under actual light can be made closer to a color sample image as the number of colorimetric values used for calculation of toner amounts becomes larger.

Modification

Although a case where the present invention is applied to an image forming apparatus that performs a printing operation by using metallic (metallic luster color) toner such as silver toner or gold toner has been described in the above exemplary embodiment, the present invention is not limited to this. The present invention can be applied to an image forming apparatus that performs a printing operation by using a color material other than toner as long as the printing operation is performed by using a glittering color material (e.g., pearl color material) whose color shade differs depending on a viewing direction.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color conversion device comprising:
a receiving unit that receives a plurality of colorimetric values obtained by measuring a plurality of target-color images of different tones from a plurality of directions;
a memory in which a color conversion model in which a combination of a colorimetric direction and amounts of color materials of respective colors and actually measured color values are associated is stored; and
a converter that converts the plurality of colorimetric values received by the receiving unit into color values including a value indicative of an amount of a glittering color material and a value indicative of an amount of a color material other than the glittering color material,
wherein the converter calculates, for each of the target-color images of the respective tones, a weighted average of color differences between colorimetric values of the target-color image in colorimetric directions and color values in the colorimetric directions obtained from the color conversion model by using preset weighting coefficients and selects a combination of weighting coefficients that makes tone characteristics closest to tone characteristics of the target-color images of the respective tones by changing the weighting coefficients for calculation of a weighted average of the color differences in the colorimetric directions when a combination of color material amounts that minimize the weighted average of the color differences is determined.

2. The color conversion device according to claim 1, wherein
the plurality of colorimetric values include, in a case where the target-color images are obliquely irradiated with light, colorimetric values of the target-color images measured in a front direction normal to the target-color images and colorimetric values of the target-color images measured in a specular direction that is a direction of specular reflection of the light.

3. The color conversion device according to claim 2, wherein
the plurality of colorimetric values further include colorimetric values of the target-color images measured in a diffusion light direction closer to a light incident direction than to the front direction.

4. The color conversion device according to claim 2, wherein
the plurality of colorimetric values further include colorimetric values of the target-color images measured in a direction close to the specular direction than to the front direction.

5. The color conversion device according to claim 3, wherein
the plurality of colorimetric values further include colorimetric values of the target-color images measured in a direction close to the specular direction than to the front direction.

6. The color conversion device according to claim 2, wherein
the converter selects, for each of the target-color images of the respective tones, a combination of weighting coefficients in which weights for color differences in colorimetric directions other than the front direction are smallest among combinations of weighting coefficients in which a difference between a multi-angle average color difference that is a simple average of the color differences in the plurality of colorimetric directions and a weighted average of the color differences is within a preset value, and selects, as the combination of weighting coefficients that makes the tone characteristics closest to the tone characteristics of the target-color images of the respective tones, a combination of weighting coefficients in which the weights for the color differences in the colorimetric directions other than the front direction are largest among a plurality of combinations of weighting coefficients selected in target-color images of any tones.

7. The color conversion device according to claim 3, wherein
the converter selects, for each of the target-color images of the respective tones, a combination of weighting coefficients in which weights for color differences in colorimetric directions other than the front direction are smallest among combinations of weighting coefficients in which a difference between a multi-angle average color difference that is a simple average of the color differences in the plurality of colorimetric directions and a weighted average of the color differences is within a preset value, and selects, as the combination of weighting coefficients that makes the tone characteristics closest to the tone characteristics of the target-color images of the respective tones, a combination of weighting coefficients in which the weights for the color differences in the colorimetric directions other than the front direction are largest among a plurality of combinations of weighting coefficients selected in target-color images of any tones.

8. The color conversion device according to claim 4, wherein
the converter selects, for each of the target-color images of the respective tones, a combination of weighting coefficients in which weights for color differences in colorimetric directions other than the front direction are smallest among combinations of weighting coefficients in which a difference between a multi-angle average color difference that is a simple average of the color differences in the plurality of colorimetric directions and a weighted average of the color differences is within a preset value, and selects, as the combination of weighting coefficients that makes the tone characteristics closest to the tone characteristics of the target-color images of the respective tones, a combination of weighting coefficients in which the weights for the color differences in the colorimetric directions other than the front direction are largest among a plurality of combinations of weighting coefficients selected in target-color images of any tones.

9. The color conversion device according to claim 5, wherein
the converter selects, for each of the target-color images of the respective tones, a combination of weighting coefficients in which weights for color differences in colorimetric directions other than the front direction are smallest among combinations of weighting coefficients in which a difference between a multi-angle average color difference that is a simple average of the color differences in the plurality of colorimetric directions and a weighted average of the color differences is within a preset value, and selects, as the combination of weighting coefficients that makes the tone characteristics closest to the tone characteristics of the target-color images of the respective tones, a combination of weighting coefficients in which the weights for the color differences in the colorimetric directions other than the front direction are largest among a plurality of combinations of weighting coefficients selected in target-color images of any tones.

10. The color conversion device according to claim 1, further comprising an output unit that outputs, on a sheet of paper, color chip columns of the target-color images of the plurality of tones obtained by changing the weighting coefficients for calculation of the weighted average of the color differences in the colorimetric directions,
wherein the converter selects the combination of weighting coefficients that makes the tone characteristics closest to the tone characteristics of the target-color images of the respective tones on a basis of a user's input operation referring to the color chip columns of the target-color images of the plurality of tones output by the output unit.

11. The color conversion device according to claim 1, wherein
the converter determines an amount of the glittering color material that minimizes a minimum value of the weighted average of the color differences by sequentially calculating, for each of different amounts of the glittering color material, the minimum value of the weighted average of the color differences obtained in a case where the amount of the color material other than the glittering color material is changed without changing the amount of the glittering color material and then determines a combination of color material amounts that minimizes the weighted average of the color differences by determining the amount of the color material other than the glittering color material obtained when the amount of the glittering color material is determined.

12. The color conversion device according to claim 1, wherein
the converter sequentially determines color material amounts of each of target-color images other than target-color images of densest and palest tones by calculating an average of the color material amounts of the target-color image and color material amounts of target-color images of other tones of adjacent tone characteristics.

13. The color conversion device according to claim 1, wherein
the glittering color material is toner of a metallic luster color.

14. An image forming apparatus comprising:
a color conversion device including: a receiving unit that receives a plurality of colorimetric values obtained by measuring a plurality of target-color images of different tones from a plurality of directions; a memory in which a color conversion model in which a combination of a colorimetric direction and amounts of color materials of respective colors and actually measured color values are associated is stored; and a converter that converts the plurality of colorimetric values received by the receiving unit into color values including a value indicative of an amount of a glittering color material and a value indicative of an amount of a color material other than the glittering color material, wherein the converter calculates, for each of the target-color images of the respective tones, a weighted average of color differences between colorimetric values of the target-color image in colorimetric directions and color values in the colorimetric directions obtained from the color conversion model by using preset weighting coefficients and selects a combination of weighting coefficients that makes tone characteristics closest to tone characteristics of the target-color images of the respective tones by changing the weighting coefficients for calculation of a weighted average of the color differences in the colorimetric directions when a combination of color material amounts that minimize the weighted average of the color differences is determined; and
an output unit that outputs an image based on the color values obtained by the conversion of the converter.

15. A non-transitory computer readable medium storing a program causing a computer to execute a process comprising:
storing a color conversion model in which a combination of a colorimetric direction and amounts of color materials of respective colors and actually measured color values are associated is stored;
receiving a plurality of colorimetric values obtained by measuring a plurality of target-color images of different tones from a plurality of directions;
calculating, for each of the target-color images of the respective tones, a weighted average of color differences between colorimetric values of the target-color image in colorimetric directions and color values in the colorimetric directions obtained from the color conversion model by using preset weighting coefficients when the plurality of colorimetric values received in the receiving are converted into color values including a value indicative of an amount of a glittering color material and a value indicative of an amount of a color material other than the glittering color material; and
selecting a combination of weighting coefficients that makes tone characteristics closest to tone characteristics of the target-color images of the respective tones by changing the weighting coefficients for calculation of a weighted average of the color differences in the colorimetric directions when a combination of color material amounts that minimize the weighted average of the color differences is determined.

* * * * *